(12) United States Patent
Kisilev et al.

(10) Patent No.: US 8,417,050 B2
(45) Date of Patent: Apr. 9, 2013

(54) MULTI-SCALE ROBUST SHARPENING AND CONTRAST ENHANCEMENT

(75) Inventors: Pavel Kisilev, Maalot (IL); Suk Hwan Lim, Foster City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 973 days.

(21) Appl. No.: 12/079,227

(22) Filed: Mar. 24, 2008

(65) Prior Publication Data

US 2009/0034864 A1 Feb. 5, 2009

Related U.S. Application Data

(63) Continuation-in-part of application No. 11/888,395, filed on Jul. 31, 2007.

(51) Int. Cl.
*G06K 9/40* (2006.01)

(52) U.S. Cl. ........ 382/261; 382/254; 382/255; 382/260; 382/266; 382/275

(58) Field of Classification Search .................. 382/254, 382/255, 260–266, 270, 274, 275
See application file for complete search history.

(56) References Cited

U.S. PATENT DOCUMENTS

| | | | | |
|---|---|---|---|---|
| 5,461,655 A | * | 10/1995 | Vuylsteke et al. | 378/62 |
| 5,467,404 A | * | 11/1995 | Vuylsteke et al. | 382/274 |
| 5,717,791 A | * | 2/1998 | Labaere et al. | 382/274 |
| 6,141,459 A | * | 10/2000 | Gendel | 382/256 |
| 6,173,084 B1 | * | 1/2001 | Aach et al. | 382/260 |
| 6,665,448 B1 | | 12/2003 | Maurer | |
| 7,149,369 B2 | * | 12/2006 | Atkins | 382/299 |
| 7,519,235 B1 | * | 4/2009 | Georgiev | 382/298 |
| 7,672,528 B2 | * | 3/2010 | Gallagher et al. | 382/256 |

OTHER PUBLICATIONS

Peter J. Burt and Edward Adelson, "The Laplacian Pyramid as a Compact Image Code", IEEE Transactions on Communications, Apr. 1983, vol. COM-31, No. 4.

Sabine Dippel, et al.; "Multiscale Contrast Enhancement for Radiographies: Laplacian Pyramid Versus Fast Wavelet Transform"; IEEE Transactions on Medical Imaging; Apr. 2002; vol. 21, No. 4.

* cited by examiner

*Primary Examiner* — Eric Rush

(57) ABSTRACT

Embodiments of the present invention employ robust filtering at each of a number of scales, or resolutions, within a signal, such as a still image or video sequence. In certain embodiments of the present invention, robust filtering comprises or includes a non-linear neighborhood operation at each scale in order to produce both a denoised, sharpened and contrast-enhanced signal and a correction signal at each scale. Correction signals and sharpened and contrast-enhanced signals are combined to produce a denoised, sharpened and contrast-enhanced output signal. Scale-appropriate enhancements at each scale or resolution, including denoising, sharpening and contrast enhancement, ameliorate artifacts introduced by re-enhancement, at a second scale or resolution, features previously enhanced at another scale or resolution and inhibit over enhancement.

20 Claims, 27 Drawing Sheets

| 0 | 0 | 0 | 0 | 0 | 5 | 5 | 5 | 5 | 5 | 5 | 0 | 0 | 0 | 0 | 0 |
|---|---|---|---|---|---|---|---|---|---|---|---|---|---|---|---|
| 0 | 0 | 0 | 0 | 5 | 10 | 15 | 16 | 14 | 10 | 5 | 5 | 0 | 0 | 0 | 0 |
| 0 | 0 | 0 | 5 | 15 | 81 | 95 | 91 | 97 | 76 | 17 | 5 | 5 | 0 | 0 | 0 |
| 0 | 0 | 0 | 10 | 80 | 96 | 46 | 40 | 47 | 91 | 73 | 10 | 5 | 0 | 0 | 0 |
| 0 | 0 | 0 | 16 | 95 | 50 | 10 | 11 | 87 | 49 | 93 | 10 | 5 | 0 | 0 | 0 |
| 0 | 0 | 0 | 11 | 98 | 34 | 9 | 8 | 8 | 43 | 94 | 19 | 5 | 0 | 0 | 0 |
| 0 | 0 | 0 | 10 | 91 | 41 | 7 | 6 | 6 | 45 | 95 | 18 | 5 | 0 | 0 | 0 |
| 0 | 0 | 0 | 5 | 81 | 90 | 45 | 44 | 43 | 98 | 79 | 10 | 5 | 0 | 0 | 0 |
| 0 | 0 | 0 | 5 | 16 | 79 | 93 | 95 | 97 | 80 | 20 | 5 | 0 | 0 | 0 | 0 |
| 0 | 0 | 0 | 5 | 5 | 10 | 16 | 17 | 13 | 10 | 5 | 0 | 0 | 0 | 0 | 0 |
| 0 | 0 | 0 | 0 | 5 | 5 | 5 | 5 | 5 | 5 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

402

H(1,2) = 0.1

| 0 | 0 | 0 | 0 | 0 | 5 | 5 | 5 | 5 | 5 | 5 | 0 | 0 | 0 | 0 | 0 |
|---|---|---|---|---|---|---|---|---|---|---|---|---|---|---|---|
| 0 | 0 | 0 | 0 | 5 | 10 | 15 | 16 | 14 | 10 | 5 | 5 | 0 | 0 | 0 | 0 |
| 0 | 0 | 0 | 5 | 15 | 81 | 95 | 91 | 97 | 76 | 17 | 5 | 5 | 0 | 0 | 0 |
| 0 | 0 | 0 | 10 | 80 | 96 | 46 | 40 | 47 | 91 | 73 | 10 | 5 | 0 | 0 | 0 |
| 0 | 0 | 0 | 16 | 95 | 50 | 10 | 11 | 87 | 49 | 93 | 10 | 5 | 0 | 0 | 0 |
| 0 | 0 | 0 | 11 | 98 | 34 | 9 | 8 | 8 | 43 | 94 | 19 | 5 | 0 | 0 | 0 |
| 0 | 0 | 0 | 10 | 91 | 41 | 7 | 6 | 6 | 45 | 95 | 18 | 5 | 0 | 0 | 0 |
| 0 | 0 | 0 | 5 | 81 | 90 | 45 | 44 | 43 | 98 | 79 | 10 | 5 | 0 | 0 | 0 |
| 0 | 0 | 0 | 5 | 16 | 79 | 93 | 95 | 97 | 80 | 20 | 5 | 0 | 0 | 0 | 0 |
| 0 | 0 | 0 | 5 | 5 | 10 | 16 | 17 | 13 | 10 | 5 | 0 | 0 | 0 | 0 | 0 |
| 0 | 0 | 0 | 0 | 5 | 5 | 5 | 5 | 5 | 5 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

| 0 | 0 | | | | | | | | | | | | | | |
|---|---|---|---|---|---|---|---|---|---|---|---|---|---|---|---|
| | | | | | | | | | | | | | | | |

Figure 4C

| 0 | 0 | 0 | 0 | 0 | 5 | 5 | 5 | 5 | 5 | 5 | 0 | 0 | 0 | 0 | 0 | 0 |
|---|---|---|---|---|---|---|---|---|---|---|---|---|---|---|---|---|
| 0 | 0 | 0 | 0 | 0 | 5 | 10 | 15 | 16 | 14 | 10 | 5 | 5 | 0 | 0 | 0 | 0 |
| 0 | 0 | 0 | 5 | 15 | 81 | 95 | 91 | 97 | 76 | 17 | 5 | 5 | 0 | 0 | 0 | 0 |
| 0 | 0 | 0 | 10 | 80 | 96 | 46 | 40 | 47 | 91 | 73 | 10 | 5 | 0 | 0 | 0 | 0 |
| 0 | 0 | 0 | 16 | 95 | 50 | 10 | 11 | 87 | 49 | 93 | 10 | 5 | 0 | 0 | 0 | 0 |
| 0 | 0 | 0 | 11 | 98 | 34 | 9 | 8 | 8 | 43 | 94 | 19 | 5 | 0 | 0 | 0 | 0 |
| 0 | 0 | 0 | 10 | 91 | 41 | 7 | 6 | 6 | 45 | 95 | 18 | 5 | 0 | 0 | 0 | 0 |
| 0 | 0 | 0 | 5 | 81 | 90 | 45 | 44 | 43 | 98 | 79 | 10 | 5 | 0 | 0 | 0 | 0 |
| 0 | 0 | 0 | 5 | 16 | 79 | 93 | 95 | 97 | 80 | 20 | 5 | 0 | 0 | 0 | 0 | 0 |
| 0 | 0 | 0 | 5 | 5 | 10 | 16 | 17 | 13 | 10 | 5 | 0 | 0 | 0 | 0 | 0 | 0 |
| 0 | 0 | 0 | 0 | 5 | 5 | 5 | 5 | 5 | 5 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 |

| | 0 | 0 | 1 | | | | | | | | | | | | | |
|---|---|---|---|---|---|---|---|---|---|---|---|---|---|---|---|---|

Figure 4D

MULTI-SCALE ROBUST SHARPENING AND CONTRAST ENHANCEMENT

CROSS-REFERENCE TO RELATED APPLICATION

This application is a continuation-in-part of application Ser. No. 11/888,395, filed Jul. 31, 2007.

TECHNICAL FIELD

The present invention is related to signal processing and, in particular, to a method for sharpening, denoising, and contrast-enhancing a signal with minimal amplification of noise inherent in the signal and with minimal propagation of sharpening-induced and contrast-enhancing-induced artifacts across multiple scales of resolution.

BACKGROUND OF THE INVENTION

Image sharpening and contrast enhancement are important components of signal processing, including image and video-signal processing. One currently available technique for sharpening, referred to as "unsharp masking," involves convolution of an original signal with a filter, subtraction of the resulting filtered image from the input image to produce a correction signal, multiplication of the correction signal by an amplification factor, and addition of the amplified correction signal to the original signal to produce an enhanced image. However, unsharp masking can have unfortunate side effects including amplifying noise within the original image and a need for tedious, empirical parameter adjustment in order to ameliorate introduction, by unsharp masking, of different types of artifacts, including halos around objects within the image and feature reflections. For these reasons, researchers and developers of signal processing methods and systems, as well as vendors of signal-processing methods and systems and vendors of various products, instruments, and devices that employ signal processing, have recognized the need for better, computationally efficient sharpening and contrast-enhancement methods and systems that minimize noise amplification and artifact introduction.

SUMMARY OF THE INVENTION

Embodiments of the present invention employ robust filtering at each of a number of scales, or resolutions, within a signal, such as a still image or video sequence. In certain embodiments of the present invention, robust filtering comprises or includes a non-linear neighborhood operation at each scale in order to produce both a denoised, sharpened and contrast-enhanced signal and a correction signal at each scale. Correction signals and sharpened and contrast-enhanced signals are combined to produce a denoised, sharpened and contrast-enhanced output signal. Scale-appropriate enhancements at each scale or resolution, including denoising, sharpening and contrast enhancement, ameliorate artifacts introduced by re-enhancement, at a second scale or resolution, features previously enhanced at another scale or resolution and inhibit over enhancement.

BRIEF DESCRIPTION OF THE DRAWINGS

FIGS. 4A-E illustrate a convolution operation.

DETAILED DESCRIPTION OF THE INVENTION

The present invention is related to sharpening, denoising, and contrast enhancement. Sharpening involves increasing the contrast associated with features in a signal, including edges, borders of objects, and other such features within a photographic image. Sharpening may involve increasing the contrast of edges, borders of objects, and other feature detail within an image with respect to large, relatively low-contrast portions of an image. Sharpening may also involve patching discontinuities within otherwise continuous feature edges and arcs. It should be noted that sharpening, or signal-processing techniques related to sharpening, may be used for a variety of different types of signals in addition to signals representing two-dimensional images, including still images and video-signal frames. Embodiments of the present invention may therefore be applied to many different types of signals. However, in the following discussion, examples are based on sharpening of two-dimensional photographic images.

Figure 1:
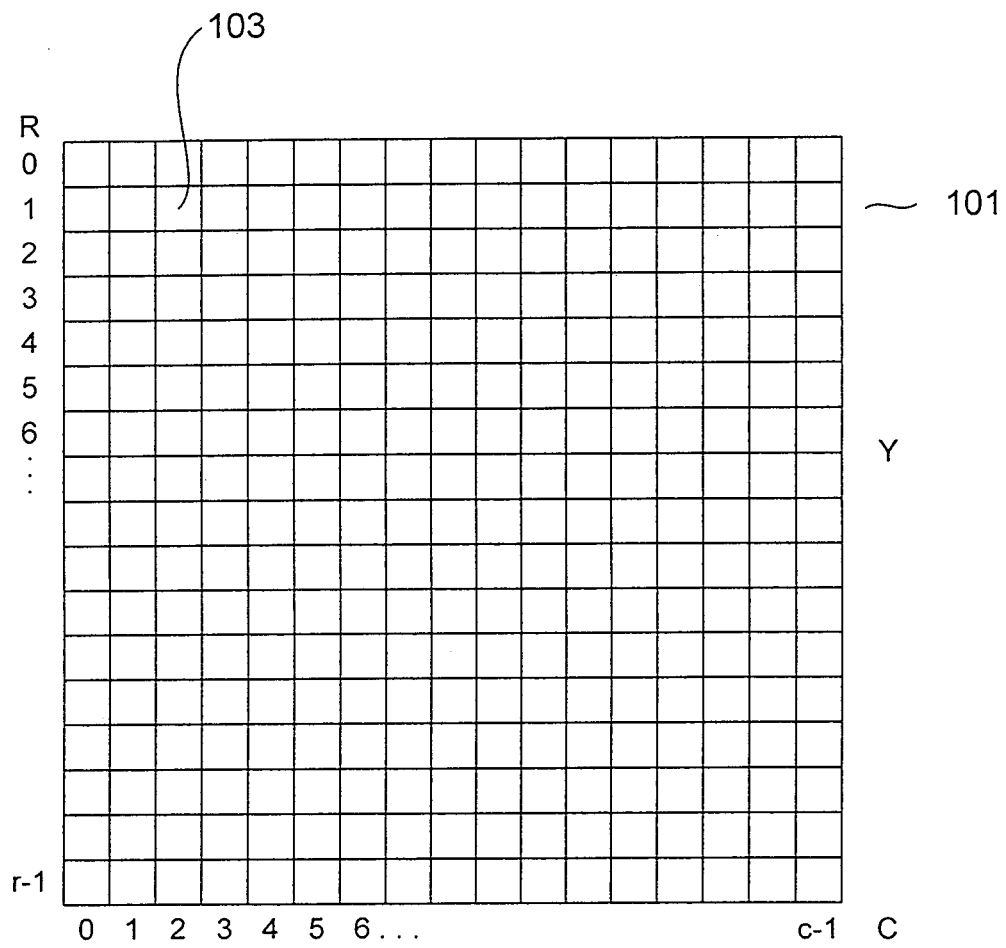
FIG. 1 illustrates a two-dimensional image signal.

FIG. 1 illustrates a two-dimensional image signal. As shown in FIG. 1, the two-dimensional image signal can be considered to be a two-dimensional matrix 101 containing R rows, with indices 0, 1, ..., r–1, and C columns, with indices 0, 1, ..., c–1. In general, a single upper-case letter, such as the letter "Y," is used to present an entire image. Each element, or cell, within the two-dimensional image Y shown in FIG. 1 is referred to as a "pixel" and is referred to by a pair or coordinates, one specifying a row and the other specifying a column in which the pixel is contained. For example, cell 103 in image Y is represented as Y(1,2).

Figure 2:
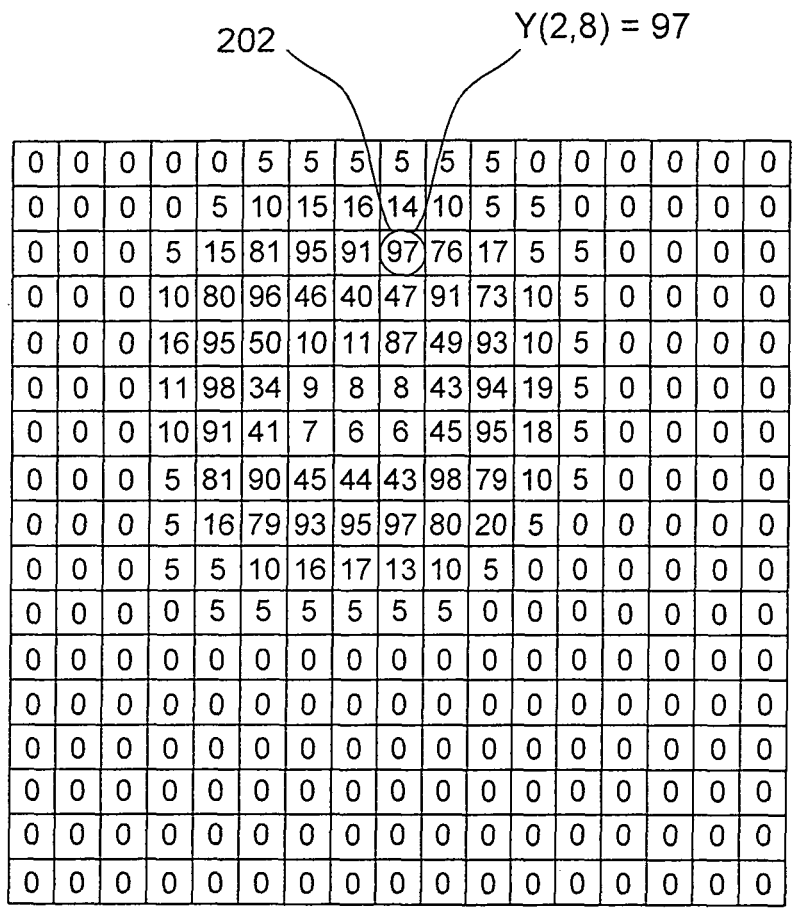
FIG. 2 shows the two-dimensional image of FIG. 1 with numerical pixel values.

FIG. 2 shows the two-dimensional image of FIG. 1 with numerical pixel values. In FIG. 2, each pixel is associated with a numerical value. For example, the pixel Y(2,8) 202 is shown, in FIG. 2, having the value "97." In certain cases, particularly black-and-white photographs, each pixel may be associated with a single, grayscale value, often ranging from 0, representing black, to 255, representing white. For color photographs, each pixel may be associated with multiple numeric values, such as a luminance value and two chrominance values, or, alternatively, three RBG values. In cases in which pixels are associated with more than one value, image-enhancement techniques may be applied separately to partial images, each representing a set of one type of pixel value selected from each pixel, image-enhancement techniques may be applied to a computed, single-valued-pixel image in which a computed value is generated for each pixel by a mathematical operation on the multiple values associated with the pixel in the original image, or image-enhancement techniques may be primarily applied to only the luminance partial image. In the following discussion, images are considered to be single-valued, as, for example, grayscale values associated with pixels in a black-and-white photograph. However, the disclosed methods of the present invention may be straightforwardly applied to images and signals with multi-valued pixels, either by separately sharpening one or more partial images or by combining the multiple values associated with each pixel mathematically to compute a single value associated with each pixel, and sharpening the set of computed values. It should be noted that, although images are considered to be two-dimensional arrays of pixel values, images may be stored and transmitted as sequential lists of numeric values, as compressed sequences of values, or in other ways. The following discussion assumes that, however images are stored and transmitted, the images can be thought of as two-dimensional matrices of pixel values that can be transformed by various types of operations on two-dimensional matrices.

In the following subsections, a number of different types of operations carried out on two-dimensional images are described. These operations range from simple numeric operations, including addition and subtraction, to convolution, scaling, and robust filtering. Following a description of each of the different types of operations, in separate subsections, a final subsection discusses embodiments of the present invention implemented using these operations.

Image Subtraction and Addition

Figure 3:
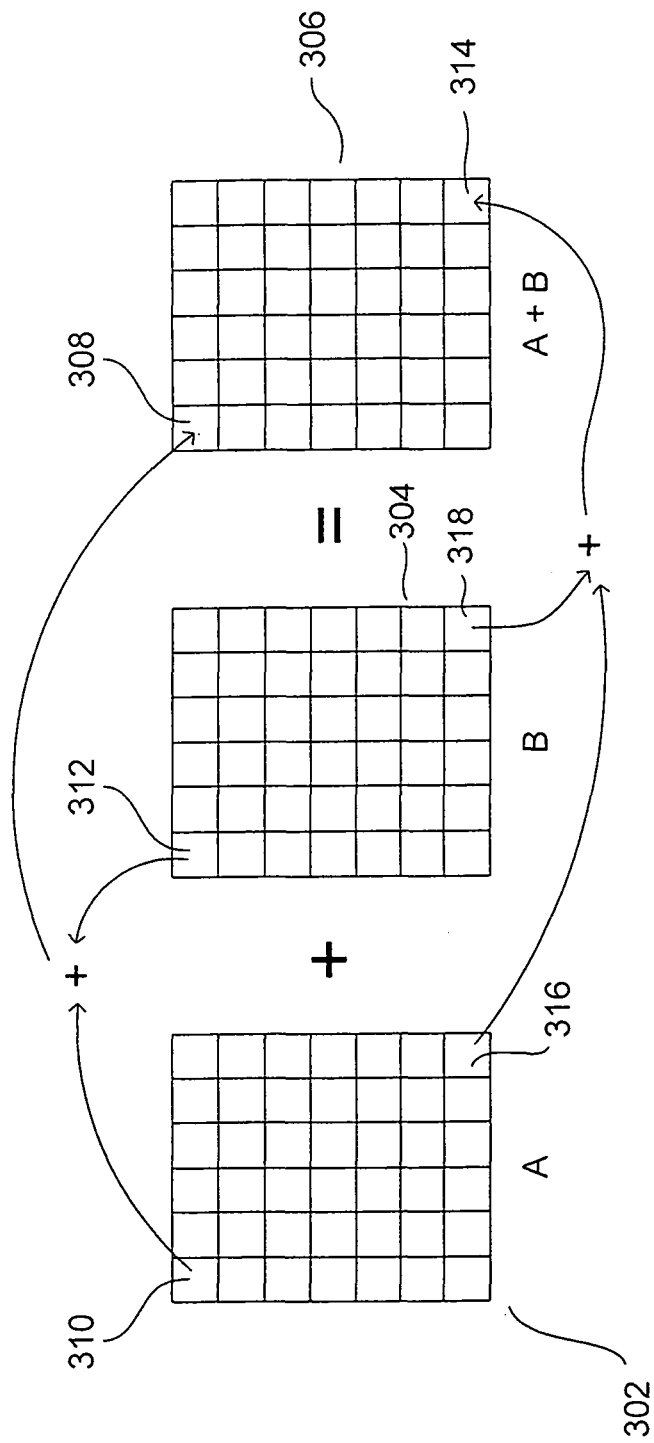
FIG. 3 illustrates addition of two images A and B.

FIG. 3 illustrates addition of two images A and B. As shown in FIG. 3, addition of image A 302 and image B 304 produces a result image A+B 306. Addition of images is carried out, as indicated in FIG. 3, by separate addition of each pair of corresponding pixel values of the addend images. For example, as shown in FIG. 3, pixel value 308 of the result image 306 is computed by adding the corresponding pixel values 310 and 312 of addend images A and B. Similarly, the pixel value 314 in the resultant image 306 is computed by adding the corresponding pixel values 316 and 318 of the addend images A and B. Similar to addition of images, an image B can be subtracted from an image A to produce a resultant image A−B. For subtraction, each pixel value of B is subtracted from the corresponding pixel value of A to produce the corresponding pixel value of A−B. Images may also be pixel-by-pixel multiplied and divided.

Convolution

Figure 4A:
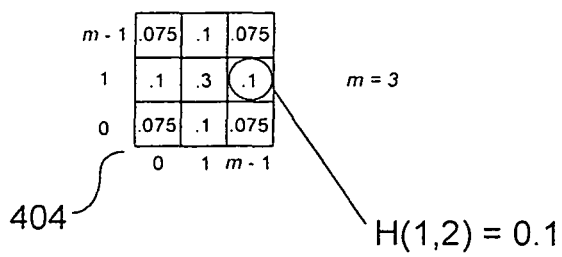

A second operation carried out on two-dimensional images is referred to as "convolution." FIGS. 4A-E illustrate a convolution operation. Convolution involves, in general, an image 402 and a mask 404. The mask 404 is normally a small, two-dimensional array containing numeric values, as shown in FIG. 4A, but may alternatively be a second image. Either an image or a mask may have a different number of rows than columns, but, for convenience, the example images and masks used in the following discussion are generally shown as square, with equal numbers of rows and columns. The image Y 402 in FIG. 4A has 17 rows and columns, while the mask 404 H has three rows and columns.

Figure 4B:
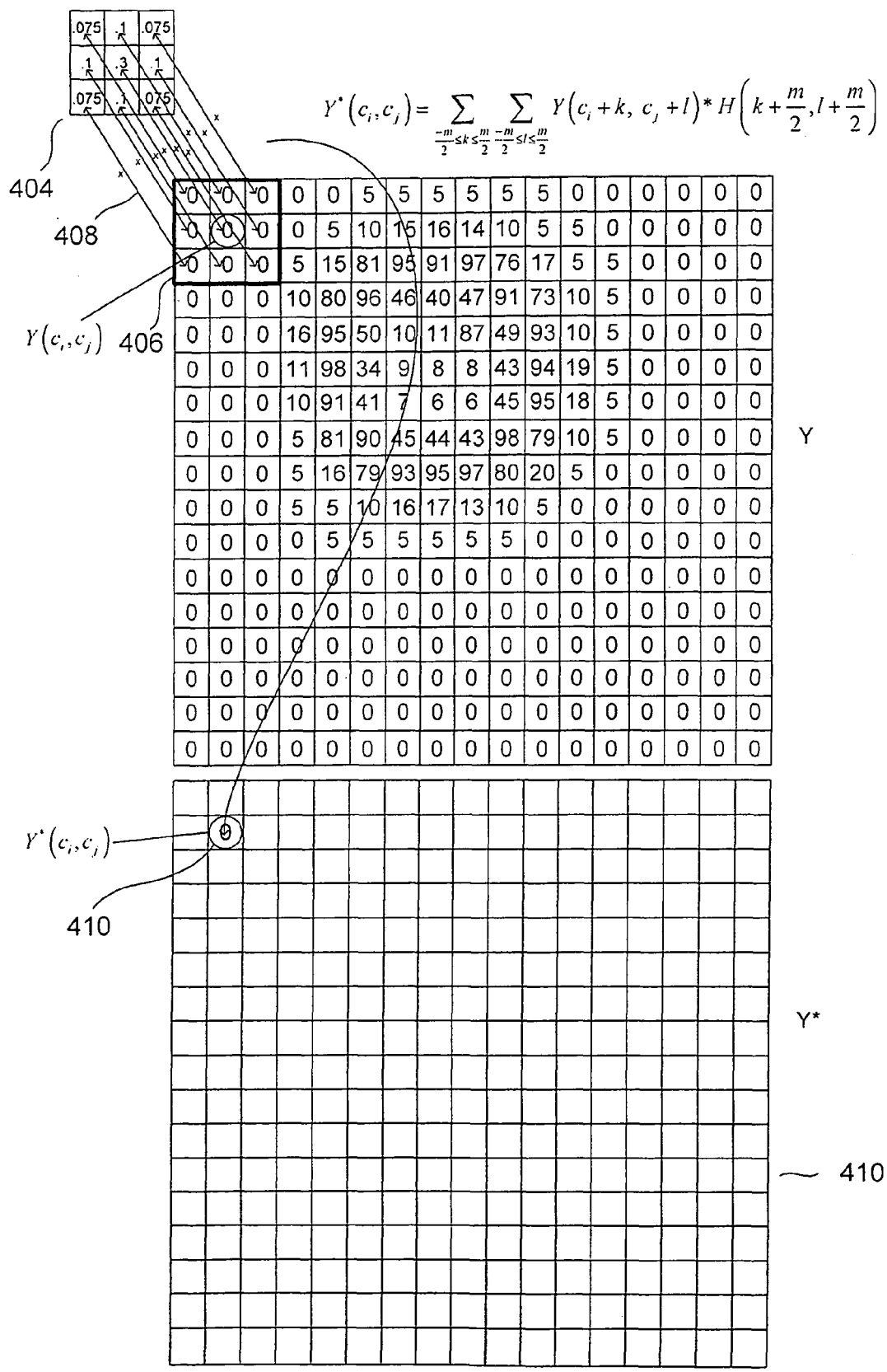

FIG. 4B illustrates computation of the first cell value, or pixel value, of the image Y* that is the result of convolution of image Y with mask H, expressed as:

$$Y^* = Y \otimes H$$

As shown in FIG. 4B, the mask H 404 is essentially overlaid with a region of corresponding size and shape 406 of the image centered at image pixel Y(1,1). Then, each value in the region of the image 406 is multiplied by the corresponding mask value, as shown by the nine arrows, such as arrow 408, in FIG. 4B. The value for the corresponding pixel Y*(1,1) 410 is generated as the sum of the products of the nine multiplications. In the general case, $Y^*(c_i, c_j)$ is computed as follows:

$$Y^*(c_i, c_j) = \sum_{-\frac{m}{2} \le k \le \frac{m}{2}} \sum_{-\frac{m}{2} \le l \le \frac{m}{2}} Y(c_i + k, c_j + l) * H\left(k + \frac{m}{2}, l + \frac{m}{2}\right)$$

where m is the size of each dimension of H, and k and l have only integer values within the ranges $$\frac{-m}{2} \le k \le \frac{m}{2} \text{ and } \frac{-m}{2} \le l \le \frac{m}{2} \text{ and } k + \frac{m}{2} \text{ and } l + \frac{m}{2}$$

also take on only integer values. FIGS. 4C and 4D illustrate computation of the second and third values of the resultant image Y*. Note that, because the mask H is a 3×3 matrix, the mask cannot be properly overlaid with image pixels along the border of image Y. In certain cases, special border masks may be used on boundary pixels, such as, for example, 2×3 masks for interior, horizontal boundary regions. In other cases, the boundary pixel values are simply transferred to the resultant image, without a mask-based transformation. In still other cases, the boundary pixels are omitted from the resultant image, so that the resultant image has fewer rows and columns than the original image. Details of treatment of boundary regions is not further discussed in the current application. It is assumed that any of the above-mentioned techniques for handling boundary pixels, or other appropriate techniques, may be applied to handle boundary pixels.

Figure 4E:
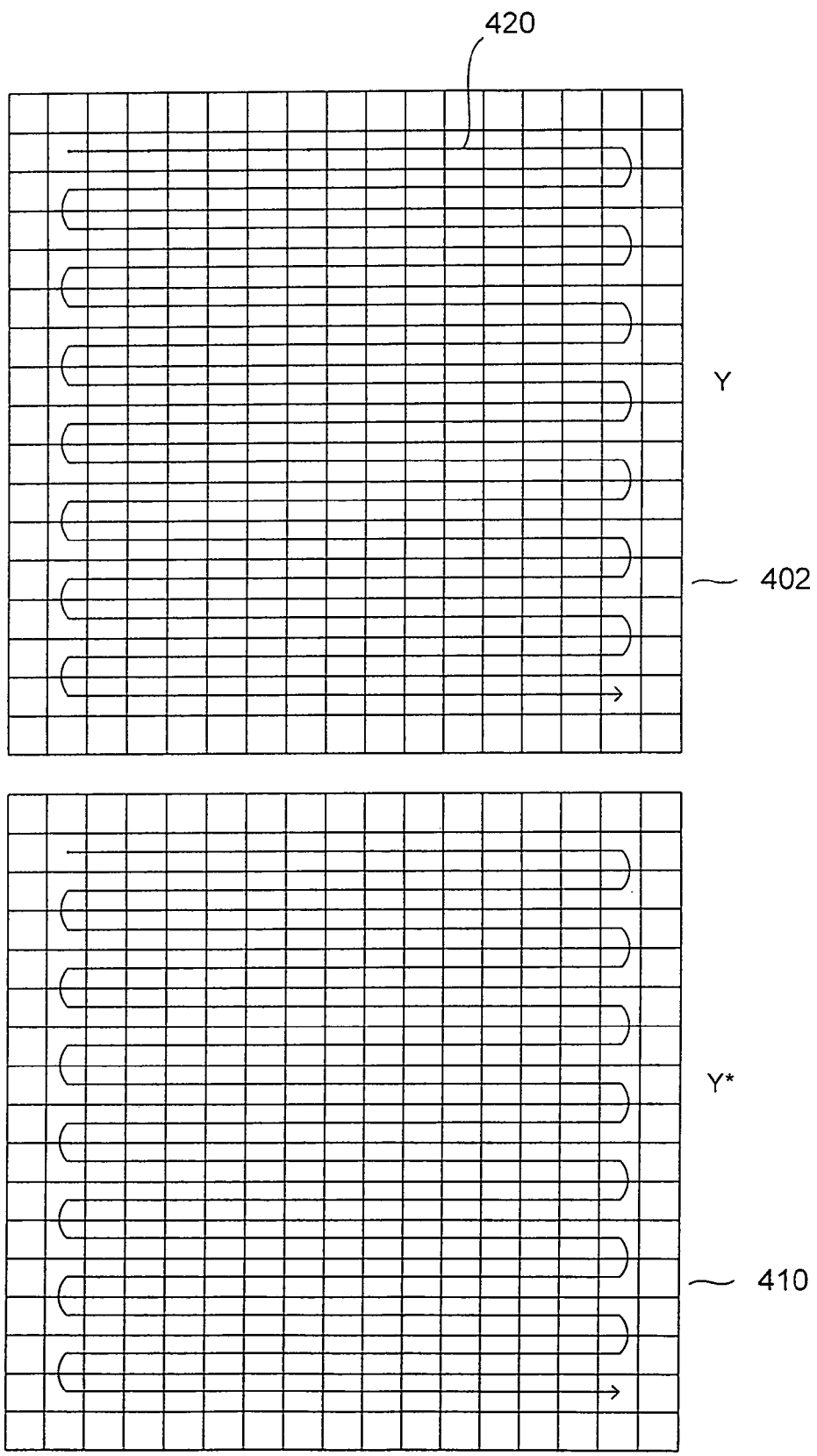

FIG. 4E illustrates a path of application of the mask H to image Y during convolution of Y×H to produce image Y*. In FIG. 4E, the path is represented by the curved arrow 420 and shows the series of successive pixels on which the mask is centered in order to generate corresponding values for the resultant image Y* 410. In alternative embodiments, a different ordering of individual mask-based operations may be employed. However, in all cases, a single mask-based operation, such as that shown in FIG. 4B, is applied to each non-boundary pixel of image Y in order to produce a corresponding value for the resultant image Y*.

Scaling

Figure 5:
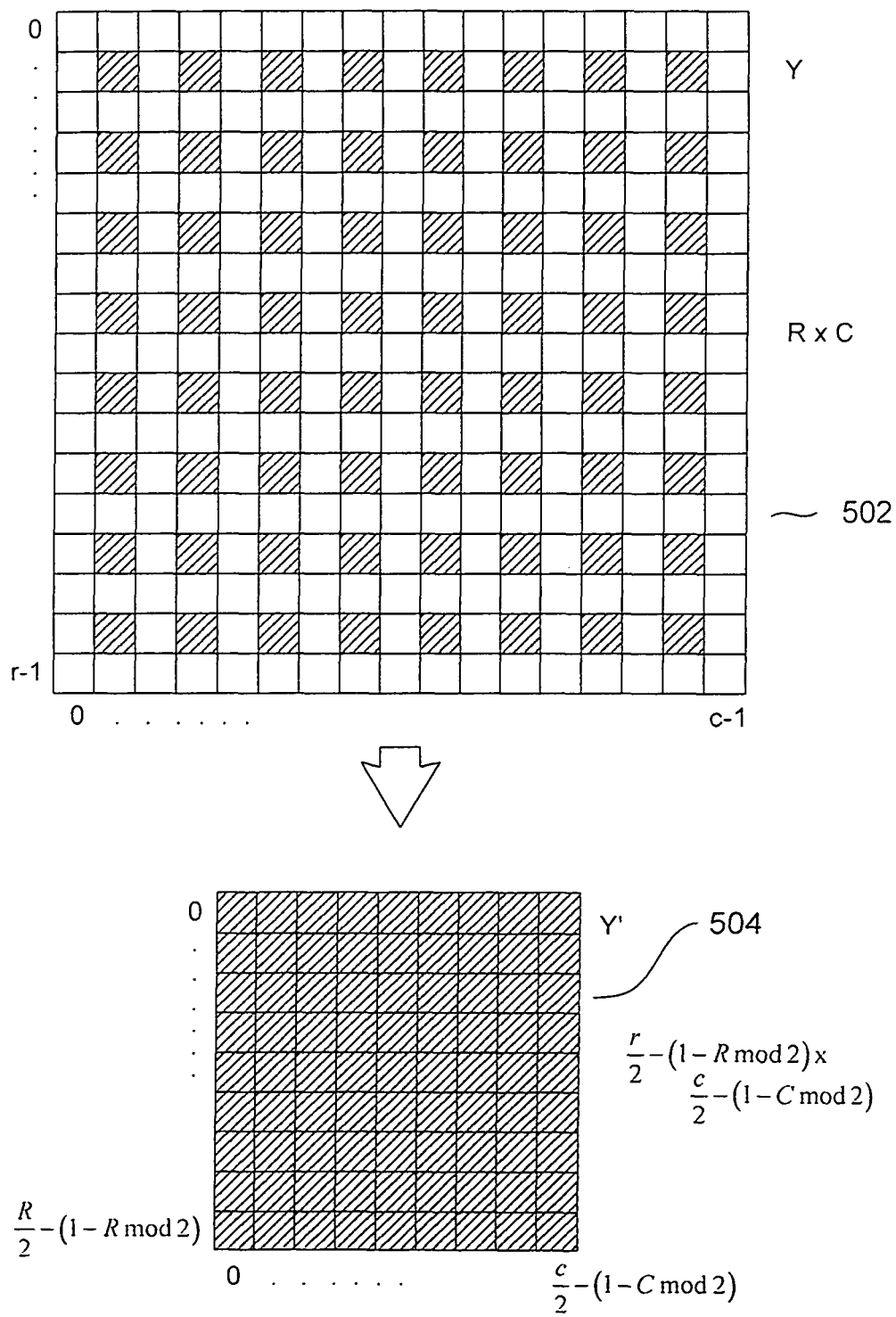
FIG. 5 illustrates one type of scaling operation, referred to as "downscaling."

FIG. 5 illustrates one type of scaling operation, referred to as "down scaling." As shown in FIG. 5, a first, original image Y 502 may be downscaled to produce a smaller, resultant image Y' 504. In one approach to downscaling, every other pixel value, shown in original image Y in FIG. 5 as cross-hatched pixels, is selected and combined together with the same respective positions in order to form the smaller, resultant image Y' 504. As shown in FIG. 5, when the original image Y is a R×C matrix, then the downscaled image Y' is an $$\left[\frac{R}{2} - (1 - R\mathrm{mod}2]\right] \times \left[\frac{C}{2} - (1 - C\mathrm{mod}2)\right]$$

image. The downscaling shown in FIG. 5 decreases each dimension of the original two-dimensional matrix by an approximate factor of ½, thereby creating a resultant, down-sized image Y' having ¼ of the number of pixels as the original image Y. The reverse operation, in which a smaller image is expanded to produce a larger image, is referred to as upscaling. In the reverse operation, values need to be supplied for ¾ of the pixels in the resultant, larger image that are not specified by corresponding values in the smaller image. Various methods can be used to generate these values, including computing an average of neighboring pixel values, or by other techniques. In FIG. 5, the illustrated downscaling is a ½×½ downscaling. In general, images can be downscaled by arbitrary factors, but, for convenience, the downscaling factors generally select, from the input image, evenly spaced pixels with respect to each dimension, without leaving larger or unequally-sized boundary regions. Images may also be downscaled and upscaled by various non-linear operations, in alternative types of downscaling and upscaling techniques.

The D Operation

Figure 6:
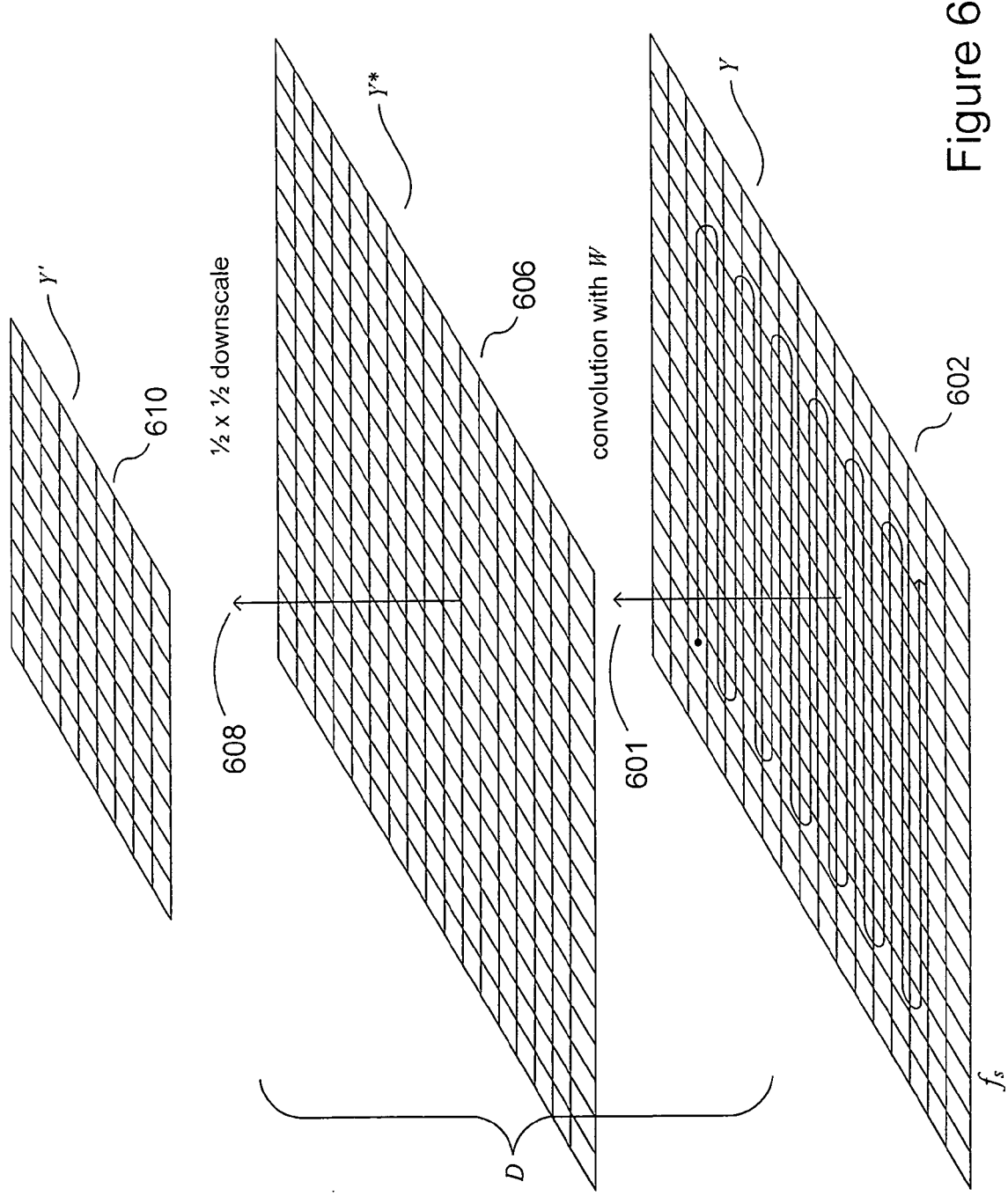
FIG. 6 illustrates one embodiment of the D operation.

FIG. 6 illustrates one embodiment of the D operation. The D operation is a logical combination of two simple operations. An original two-dimensional image, or signal, Y 602 is first convolved with a weight mask W 604 to produce a filtered, resultant image Y* 606. This intermediate-result matrix Y* is then downscaled by a ½×½ downscale operation 608 to produce a final resultant image Y' 610.

Figure 7:
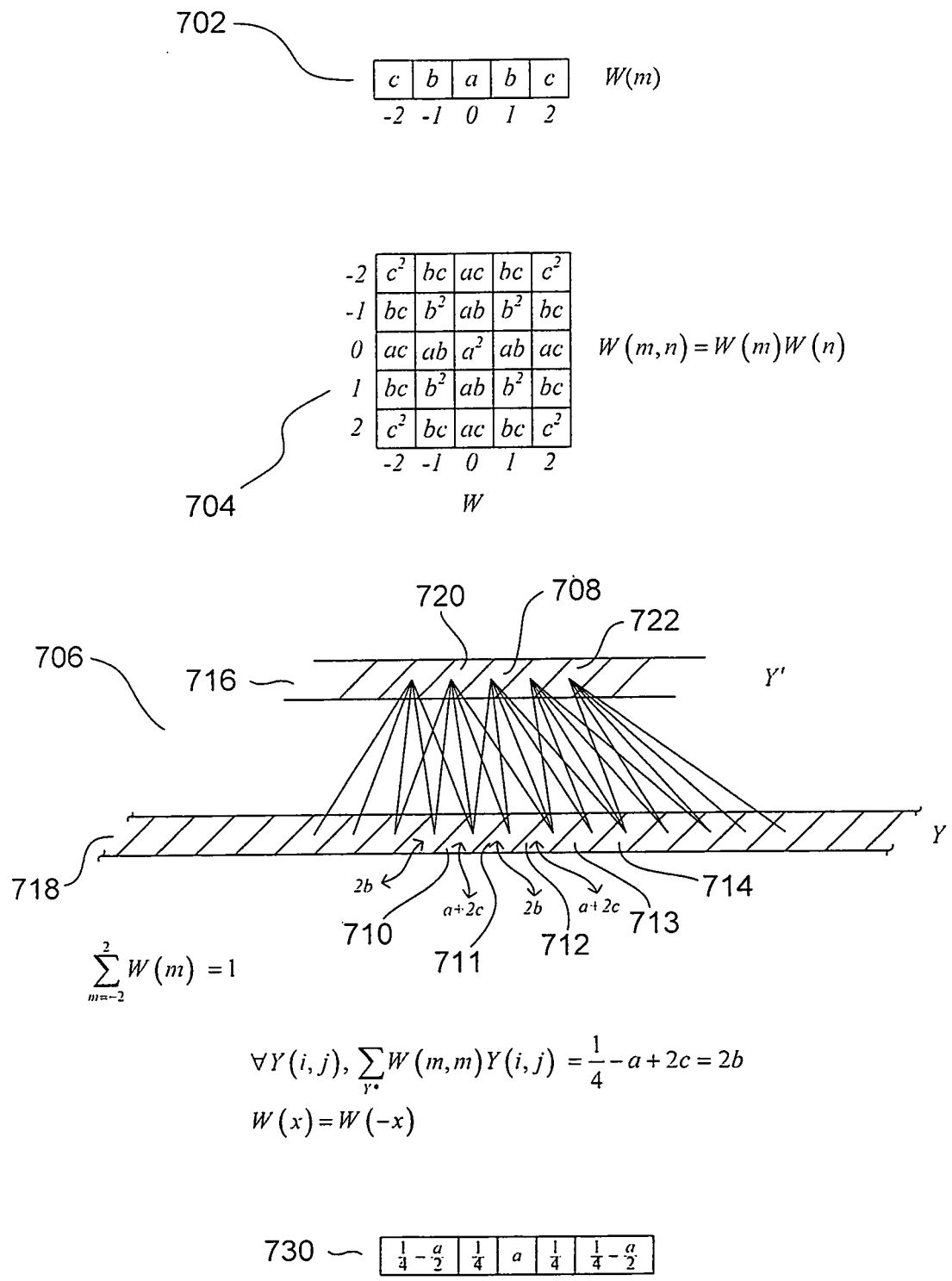
FIG. 7 illustrates computation of the weights included in a weight mask W.

FIG. 7 illustrates computation of the weights included in the weight mask W. A one-dimensional mask W(m) 702, where m=5, is shown in FIG. 7 to include three numeric values a, b, and c. The one-dimensional weight mask 702 is symmetric about the central element, with index 0, containing the value a. The two-dimensional weight mask W(m,m) can be generated by a matrix-multiplication-like operation in which a row vector W(m) is multiplied by a column vector W(m) to generate the two-dimensional weight matrix W 704. Considering the D operation, discussed with reference to FIG. 6, in a one-dimensional case 706, each pixel of the resultant image Y', such as pixel 708, is produced, via the one-dimensional mask 702, by a linear combination of five pixels 710-714 in the original image Y. In FIG. 7, lines are drawn, for a number of pixels within a row 716 of the resultant image Y', connecting the pixels with the corresponding pixels in a row 718 of the original image Y that contribute values to each of the pixels in the resultant image Y'. Using the one-dimensional mask 702, it is apparent that original-image pixel values 710 and 714 are both multiplied by value c, original-image pixel values 711 and 713 are both multiplied by the value b, and the pixel value 712 of the original image Y is multiplied by the value a in the masking operation that produces the pixel value 708 of the resultant image Y'. Because of the downscale-operation-component of the operation D, every other pixel in the original image Y serves as the central pixel in a masking operation to produce corresponding pixel value in Y'. Thus, original-image pixel 712 is the central pixel of a mask operation leading to resultant-image Y' pixel value 708. However, original-image-pixel 712 also contributes to resultant-image-pixel values 720 and 722, in each case multiplied by value c. Thus, pixel 712 of the original image represents a first type of original-image pixel that is used in three different individual mask operations to contribute to the values of three different resultant-image pixels, once multiplied by the value a and twice multiplied by the value c. However, the neighboring original-image pixels 711 and 713 each represent a second type of original-image pixel that is used only twice in masking operations to contribute to the values of two resultant-image pixels, in both cases multiplied by the value b. As shown in FIG. 7, these two different types of pixels alternate along the illustrated dimension of the original image.

As shown in FIG. 7, there are three constraints applied to the weight values within the weight matrix W. First, the weights are normalized in each dimension:

$$\sum_{m=-2}^{2} W(m) = 1$$

A second constraint is that each pixel of the original image contributes ¼ of its value to the resultant image, or:

$$\forall\, Y(i, j), \sum_{Y'} W(m, m)Y(i, j) = \frac{1}{4}(Y(i, j))$$

where the sum is over all pixels of Y' to which original-image pixel Y(i,j) contributes. A final constraint is that, in each dimension, the weight mask is symmetric, or:

$$W(x) = W(-x)$$

Applying these constraints, a one-dimensional weight matrix W(m) with m=5 that meets these constraints 730 includes the following values expressed numerically in terms of the value a:

$$a = a$$
$$b = \frac{1}{4}$$
$$c = -\frac{a}{2}$$

where the value a is selectable, as a parameter, from values greater than 0 and less than 1.

The weight matrix W is an approximate Gaussian filter. In other words, a is significantly greater than b, and b, in turn, is somewhat greater than c. In the one-dimensional case, the weight values approximately correspond to a Gaussian, bell-shaped curve. In the two-dimensional case, the values of the weight matrix approximately correspond to a two-dimensional, rounded Gaussian peak. In one embodiment of the present invention, the 5×5 weight mask W shown in FIG. 7 is used in the D operation, as well as in a corresponding U operation, discussed below. In alternative embodiments, weight masks with larger or smaller dimensions may be employed, with different weights that approximate different, alternative types of curves.

Convolution of a Gaussian weight mask with an image produces a smoothed image. Extreme pixel values in an original image are altered to better correspond with the values of their neighbors. A smoothing filter thus tends to remove noise and high-contrast artifacts.

Figure 8:
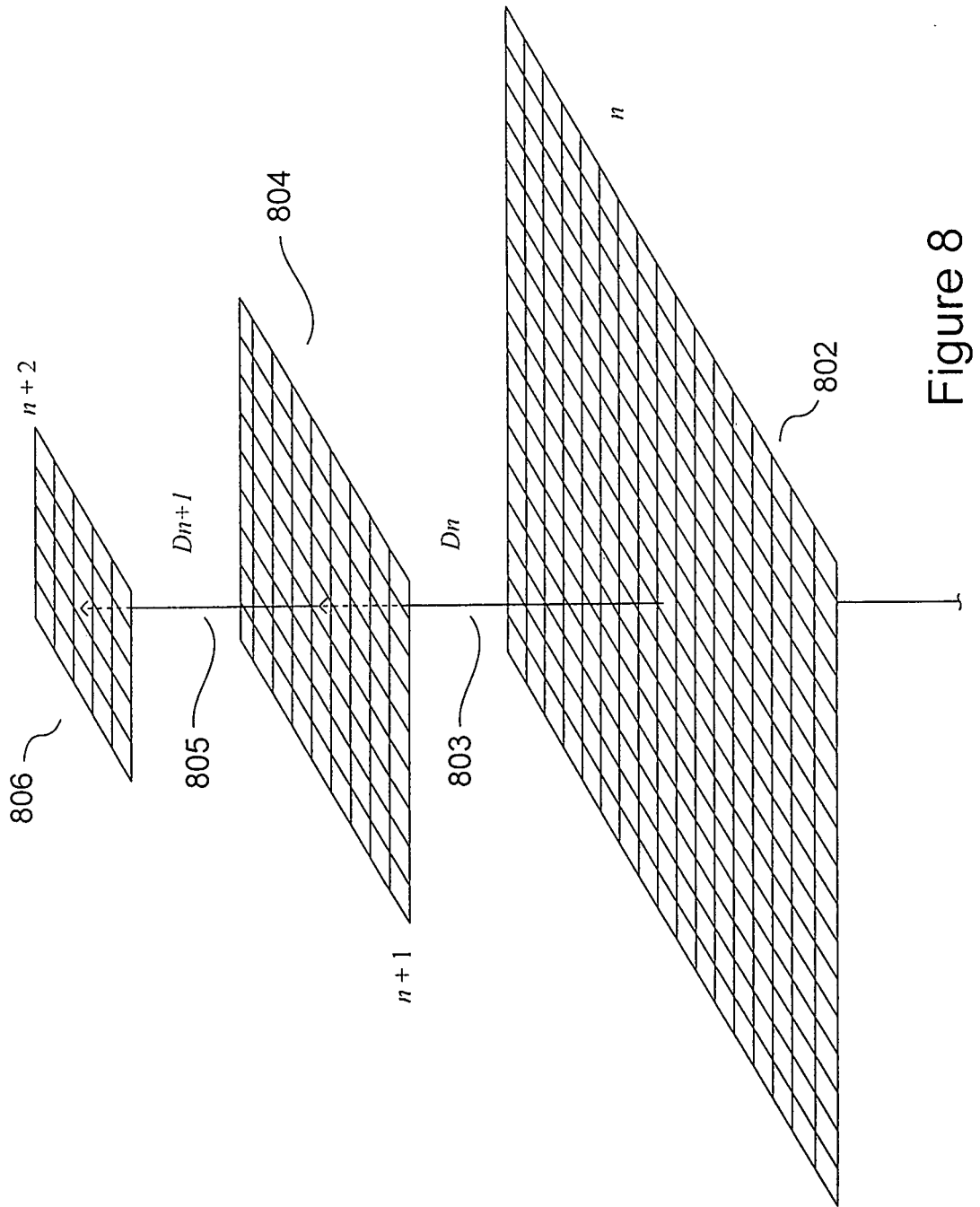
FIG. 8 illustrates a portion of a Gaussian pyramid obtained by applying the D operation twice to an intermediate-scale image.

The D operations, described above with reference to FIGS. 6 and 7, can be successively applied to an original image to produce a succession of resultant images with successively increasing scales, or decreasing resolutions. FIG. 8 illustrates a portion of a Gaussian pyramid obtained by applying the D operation twice to an intermediate-scale image. In FIG. 8, a first D operation, $D_n$ 103, is applied to an intermediate-scale image 802 to produce a smaller, lower-resolution image 804 at scale m+1. A second D operation, $D_{n+1}$ 805, is applied to this lower-resolution image 804 produces a still lower-resolution image 806 at scale n+2.

Alternative D operations that comprise only linear downscaling by sub-sampling may be used, rather than the above-described D-operation embodiment. In yet additional, alternative D operations, a non-linear operation may be employed.

The U Operation

Figure 9:
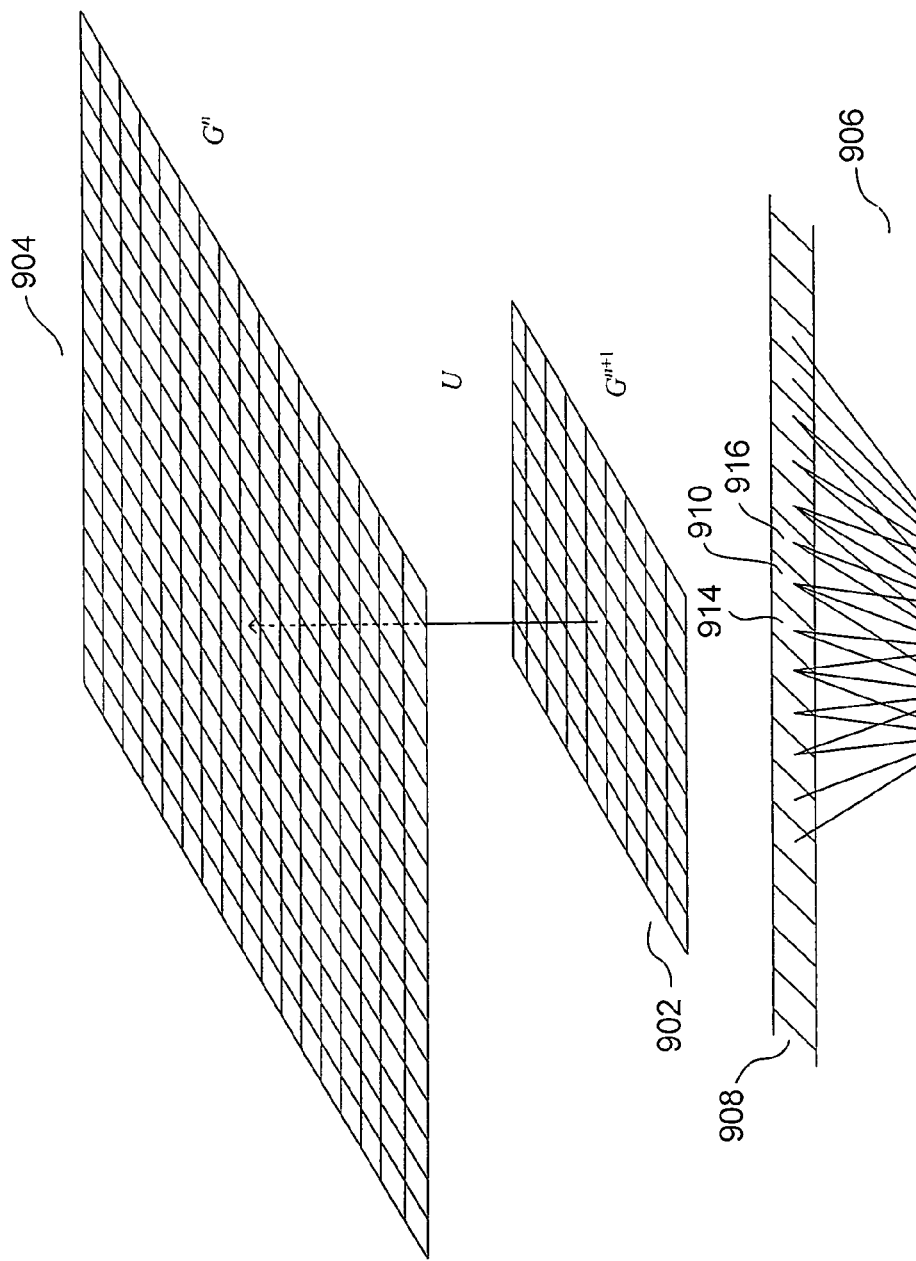
FIG. 9 illustrates one embodiment of the U operation.

The U operation is complementary to, or opposite from, the D operation described in the previous subsection. FIG. 9 illustrates one embodiment of the U operation. As shown in FIG. 9, the U operation transforms a lower-resolution, smaller image, $G^{n+1}$ 902, at scale n+1 to a larger, higher-resolution image, $G^n$ 904, at scale n. The U operation is shown 906 in the one-dimensional case as essentially the reverse of the D operation discussed above (706 in FIG. 7). In the resultant, larger image, one row or column 908 of which is shown in FIG. 9, the value every other pixel, such as pixel 910, is contributed to by the values of three pixels in the lower-resolution, smaller image 912, while the values of adjacent pixels, such as pixels 914 and 916, are contributed to by the values of only two pixels within the lower-resolution image 912. The U operation can be expressed as:

$$G^n(i, j) = 4 \sum_{m=-2}^{2} \sum_{n=-2}^{2} W(m, n) G^{n+1}\left(\frac{l-m}{2}, \frac{j-n}{2}\right)$$

where only integral values of $$\frac{i-m}{2} \text{ and } \frac{j-n}{2}$$

are used.

Alternative U operations that comprise only linear upscaling by sub-sampling with linear or non-linear interpolation may be used, rather than the above-described U-operation embodiment. In yet additional, alternative U operations, a non-linear operation may be employed.

Robust Filtering

Robust filtering is a rather complex operation performed on an original image Y to produce a resultant image $\hat{Y}$ where:

$$\hat{Y} = \Psi(Y)$$

Figure 10:
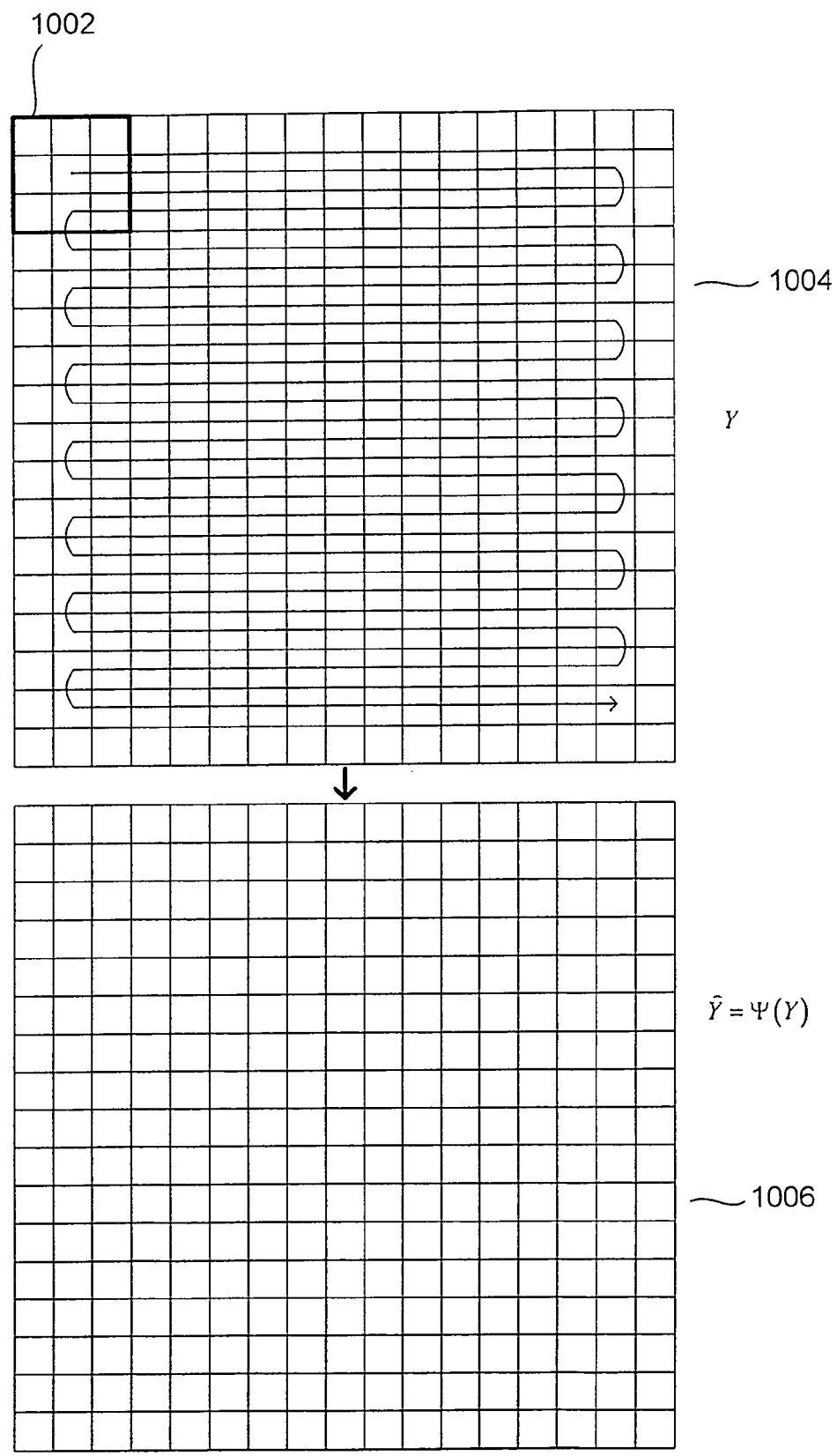
FIG. 10 illustrates one embodiment of a robust-filtering operation that represents an embodiment of the present invention.

While the phrase "robust filtering" accurately describes certain embodiments of the present invention, other alternative embodiments of what is referred to as "robust filtering" may not be, strictly speaking, filtering operations, but may instead involve non-filter operations. Nonetheless, the phrase "robust filtering" is employed, in the following discussion, to mean the collection of filtering, enhanced filtering, and non-filtering methods that can be employed at similar positions within the subsequently described multi-scale robust filtering and contrast enhancement methods and systems that represent embodiments of the present invention. FIG. 10 illustrates one embodiment of a robust-filtering operation that represents an embodiment of the present invention. As shown in FIG. 10, the robust-filtering operation is reminiscent of convolution, in that a 3×3 region 1002 of the original image Y 1004 is considered for each non-boundary pixel within the original image Y in order to generate the corresponding pixel values of the resultant image $\hat{Y}$ 1006. However, the 3×3 region is a window, rather than the shadow of a mask, as in a convolution operation. The pixel values within the window are used to generate the value for the corresponding pixel in the resultant image $\hat{Y}$, in the robust-filtering operation, rather than a mathematical operation involving both image-region and mask values, in a convolution operation.

Figure 11:
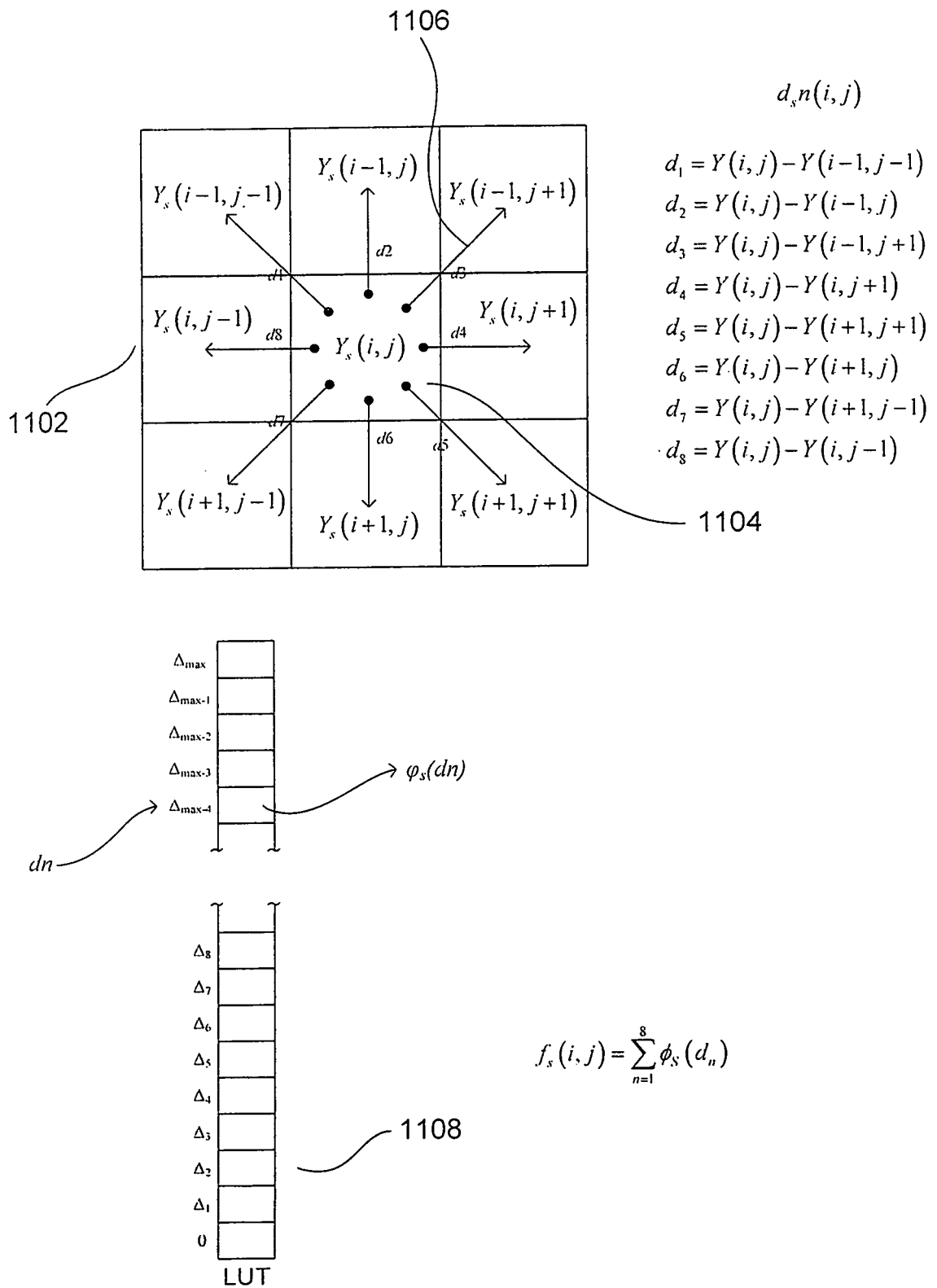
FIG. 11 illustrates the filter operation $f_s(i,j)$ carried out on each pixel $Y(i,j)$ of an original image Y as part of the robust-filter operation, described above with reference to FIG. 10.

FIG. 11 illustrates the filter operation $f_s(i,j)$ carried out on each pixel Y(i,j) of an original image Y as part of the robust-filter operation, described above with reference to FIG. 10. FIG. 11 shows a window $W_s$ 1102 where the s refers to a particular scale at which the robust-filtering operation is undertaken. Robust-filtering operations may be different at each of the different scales at which they are undertaken during image enhancement. Again, the window $W_s$ is a small, 3×3 region of an image $Y_s$ at scale s. The window is centered at the $Y_s$ pixel $Y_s(i,j)$ 1104. In order to compute the filtering operation $f_s(i,j)$, differences are computed by subtracting each non-central pixel value within the window $W_s$ from the central pixel value within the window $W_s$, as indicated by eight arrows, including arrow 1106, in FIG. 11. This operation produces the following eight computed difference values:

$$d_1 = Y(i,j) - Y(i-1, j-1)$$

$$d_2 = Y(i,j) - Y(i-1, j)$$

$$d_3 = Y(i,j) - Y(i-1, j+1)$$

$$d_4 = Y(i,j) - Y(i, j+1)$$

$$d_5 = Y(i,j) - Y(i+1, j+1)$$

$$d_6 = Y(i,j) - Y(i+1, j)$$

$$d_7 = Y(i,j) - Y(i+1, j-1)$$

$$d_8 = Y(i,j) - Y(i, j-1)$$

In alternative embodiments, a differently sized region of the image may be used as a window, and a different number of differences is generated during each window-based operation.

Figure 12:
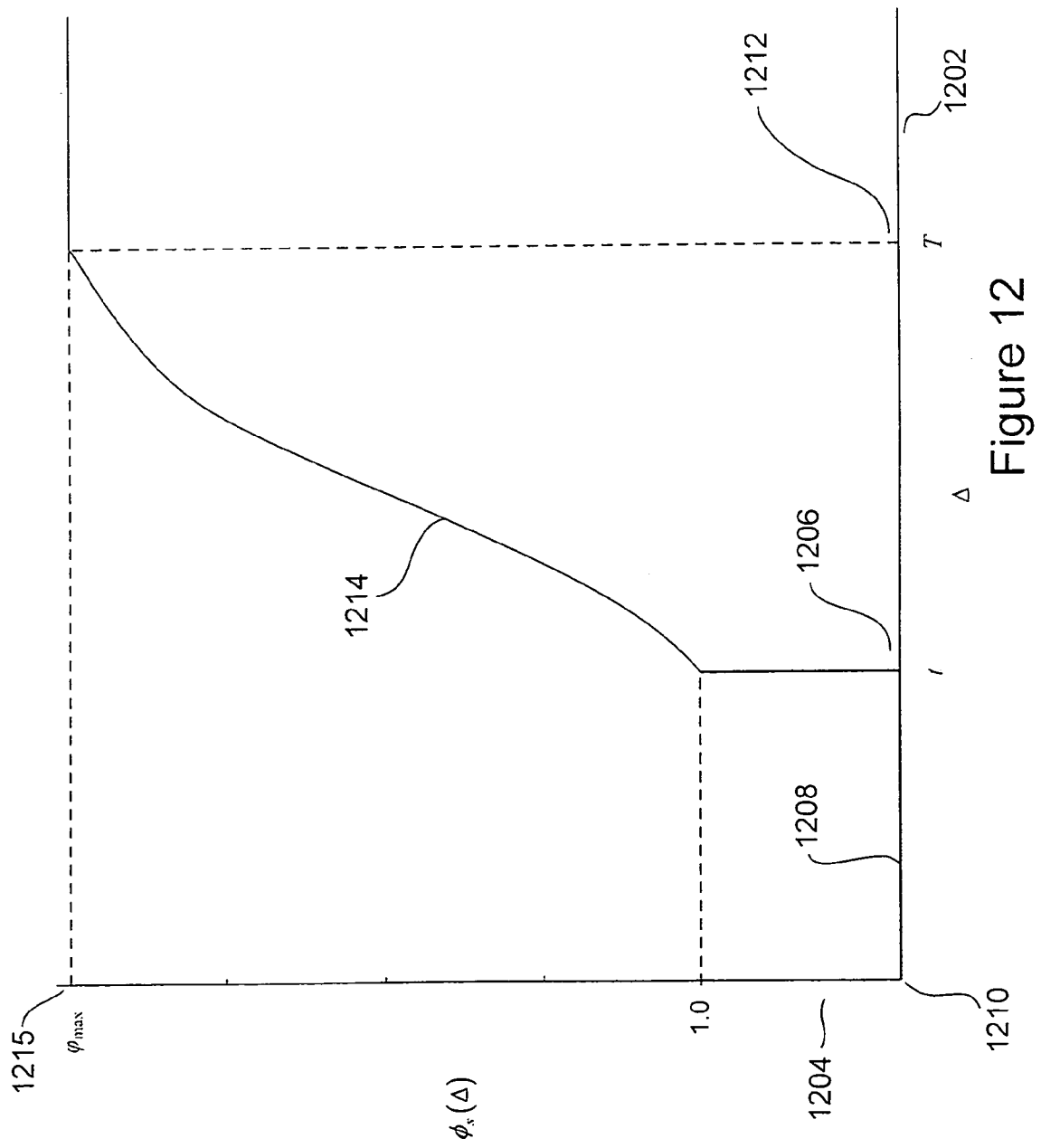
FIG. 12 illustrates the general form of the non-linear function used in the filter operation $f_s(i,j)$.

Each of the differences $d_n$, where $n \in \{1, 2, \ldots, 8\}$, are used as an index into a lookup table 1108, with corresponding values in the lookup table representing a function $\phi_s$ applied to each of the different differences. The lookup table is a discrete representation of a non-linear function. FIG. 12 illustrates the general form of the non-linear function used in the filter operation $f_s(i,j)$. As shown in FIG. 12, the function $\phi_s$ computes a value $\phi_s(\Delta)$ for each different possible $\Delta$ in the domain, represented by the horizontal axis 1202. Below a first threshold t 1206, the function $\phi_s$ returns a value of 0, as represented by the horizontal segment 1208 of function $\phi_s$ from the origin 1210 to the first threshold $\Delta=t$ (1206). Between the first threshold $\Delta=t$ (1206) and a second threshold $\Delta=T$ (1212), the function $\phi_s$ returns a value somewhat greater than the corresponding $\Delta$ value. In other words, between $\Delta=t$ and $\Delta=T$, $\phi_s(\Delta)$ is an amplified value corresponding to an input $\Delta$ value, as represented by the curved segment 1214 of the function $\phi_s$ shown in FIG. 12. At the second threshold $\Delta=T$ (1212), the function $\phi_s(\Delta)$ reaches a maximum value $\phi_{max}$ 1214, and for all $\Delta$ values greater than T, function $\phi_s(\Delta)$ returns the maximum value $\phi_{max}$. Various different functions $\phi_s$ may be employed in different embodiments of the present invention. In the embodiment shown in FIG. 12, $\phi_s$ is an s-curve-like non-linear function between thresholds $\Delta=t$ and $\Delta=T$. In alternative embodiments, this portion of the graph of $\phi_s$ may be a straight line with a positive slope greater than 1.0, and in other embodiments, may have other, different forms. In general, whether linear or non-linear, this central portion of the graph of $\phi_s$ is non-decreasing over $t \leq \Delta \leq T$.

The final, computed filter value $f_s$ for pixel $Y_s(i,j)$ is then the sum of the eight values $\phi(d_n)$ computed by applying the function $\phi_s$, described with reference to FIG. 12, where the $d_n$ values are the eight difference values computed by subtracting each of the neighboring pixel values from the central pixel value, as shown in FIG. 11:

$$f_s(i, j) = \sum_{n=1}^{8} \phi_S(d_n)$$

Figure 13:
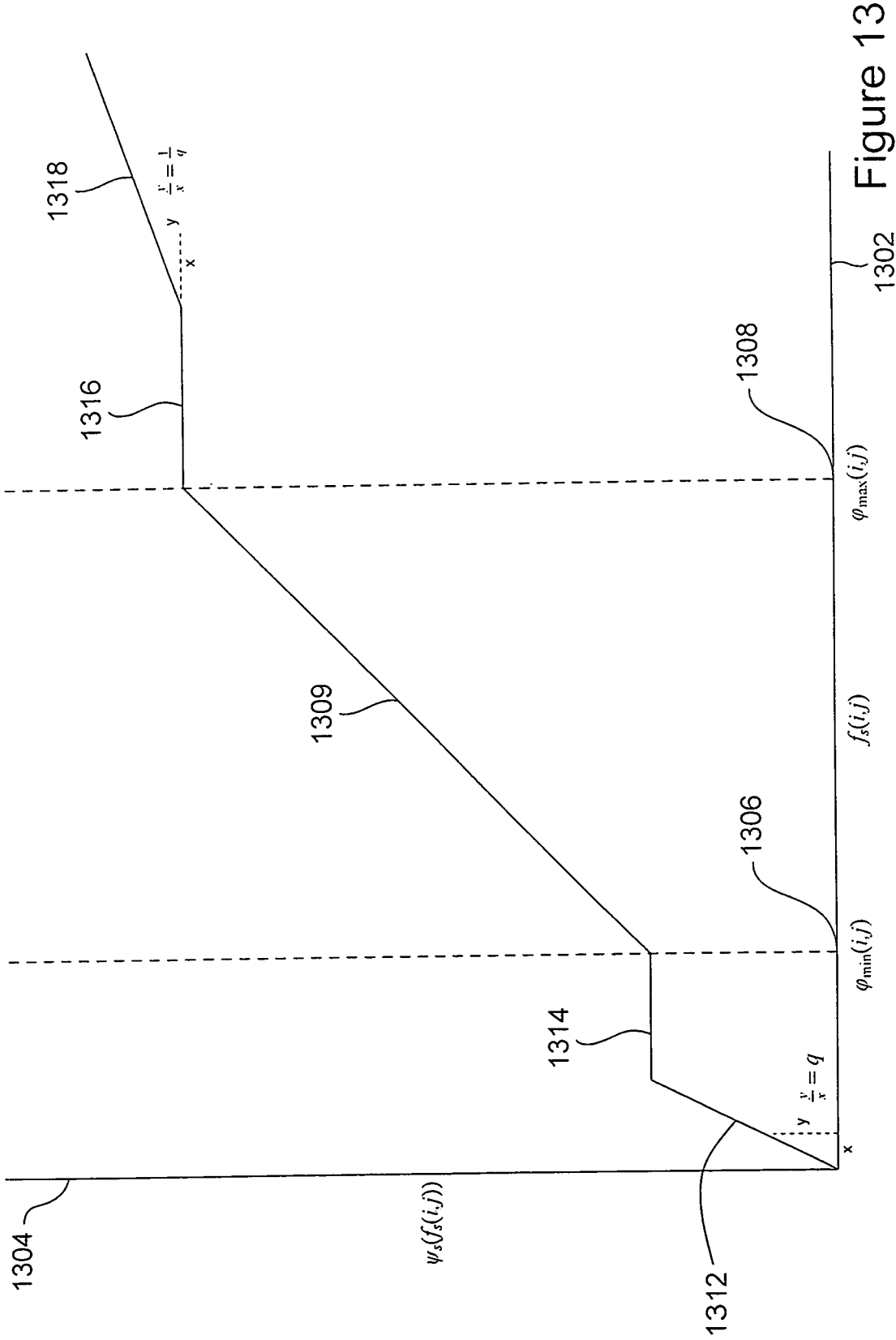
FIG. 13 illustrates the function $\psi_s$.

A final operation is performed on the filter value $f_s(i,j)$, computation of which is discussed above with reference to FIGS. 11-12. This operation, represented as function $\psi$, is used to remove any new local maxima and minima introduced by robust filtering. FIG. 13 illustrates the function $\psi_s$. The domain of the function, represented by the horizontal axis 1302, comprises the values $f_s(i,j)$ computed, as discussed above, with reference to FIGS. 11-12. The function $\psi_s$ computes corresponding values $\psi_s(f_s(i,j))$, represented by the vertical axis 1304 in FIG. 13. Between a lower threshold $\phi_{min}(i,j)$ 1306 and an upper threshold $\phi_{max}(i,j)$ 1308, $\psi_s(f_s(i,j))$ returns $f_s(i,j)$, as indicated by the straight line segment 1309 with slope 1 in the graph of function $\phi_s$. Below the first threshold, $\phi_{min}(i,j)$ 1306, the function $\psi_s$ multiplies an input value $f_s(i,j)$ by a value q greater than 1.0, and uses the minimum of the result of this multiplication or $\phi_{min}(i,j)$ for the value returned $\psi_s$, as represented by the initial segment 1312 with slope q followed by the flat segment 1314 with slope 0. Above the threshold $\phi_{max}(i,j)$, an input value $f_s(i,j)$ is divided by the factor q, and the greater of $\phi_{max}(i,j)$ or $$\frac{f_s(i, j)}{q}$$

is returned as the value $\psi_s(f_s(i,j))$, as illustrated by the initial flat segment 1316 and following straight-line segment 1318 with slope $$\frac{1}{q}.$$

Thus, $\psi_s$ amplifies very low $f_s(i,j)$ values and decreases very large $f_s(i,j)$ values. The lower threshold $\phi_{min}(i,j)$ is the least pixel value within the window $W_s$ about pixel $Y_s(i,j)$, and the threshold $\phi_{max}(i,j)$ is the greatest pixel value within the window $W_s$ about pixel $Y_s(i,j)$. Thus each pixel of the robustly filtered image $\hat{Y}$ 1006 in FIG. 10 is computed by the robust-filter operation as:

$$\hat{Y}_s(i, j) = \psi_s(f_s(i, j)) = \psi_s\left(\sum_{n=1}^{8} \phi_s(d_n(i, j))\right)$$

for the 3×3 window discussed above and illustrated in FIG. 11. Alternatively, the filter operation can be expressed as:

$$\hat{Y}_s(j, k) =$$

$$\psi_s[Y_s^*(j, k)] = \psi_s\left[Y_s(j, k) + \sum_{Y(l,m) \in W_{jk}} \varphi_{t_s, T_s}[Y_s(j, k) - Y_s(l, m)]\right],$$

$$\psi_s[Y_s^*(j, k)] = \begin{cases} \min[Y_s^*(j, k), q_s \cdot Y_{W_{jk}}^{\max}], & \text{if } Y_s^*(j, k) > Y_{W_{jk}}^{\max} \\ \max[Y_s^*(j, k), Y_{W_{jk}}^{\min} / q_s], & \text{if } Y_s^*(j, k) < Y_{W_{jk}}^{\min} \\ Y_s^*(j, k), & \text{otherwise} \end{cases}$$

Many different, alternative robust-filter operations are possible. For example, while the window used in the $f_s(i,j)$ component operation, discussed above, involves neighboring pixels to pixel $Y(i,j)$ at the same scale as which robust filtering is being applied, in alternative robust-filtering embodiments, the window may include neighboring pixels to pixel $Y(i,j)$ at higher-resolution, lower-resolution scales, or both higher-resolution and lower-resolution scales, or that neighbor the closest, interpolated pixel corresponding to pixel $Y(i,j)$. Many different non-linear and linear functions may be employed in addition to, or instead of one or both of $\psi$ and $\phi$ in alternative embodiments.

One Embodiment of the Present Invention

Figure 14:
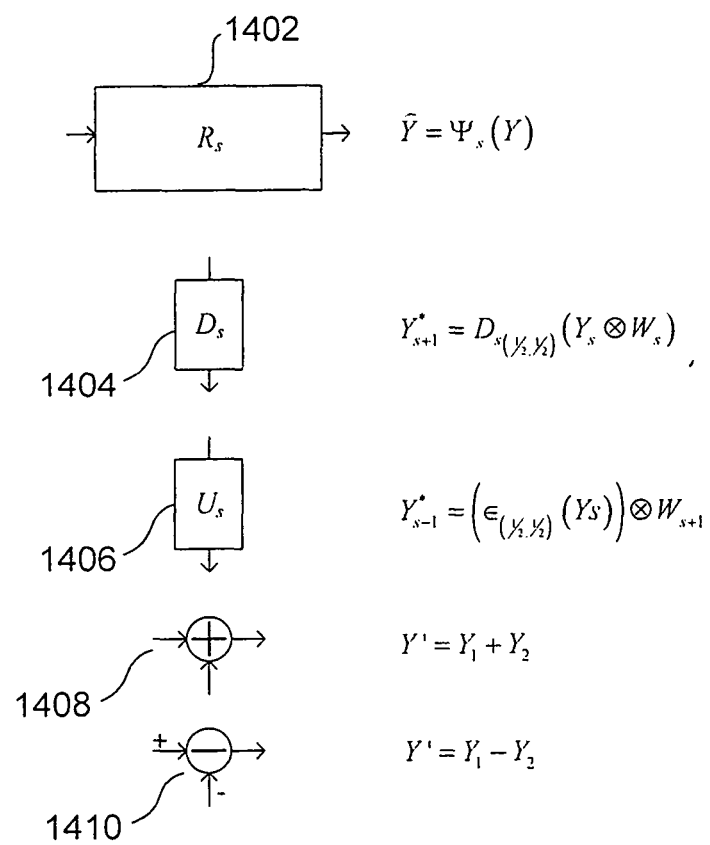
FIG. 14 shows a number of illustration conventions used in FIG. 15.
Figure 15:
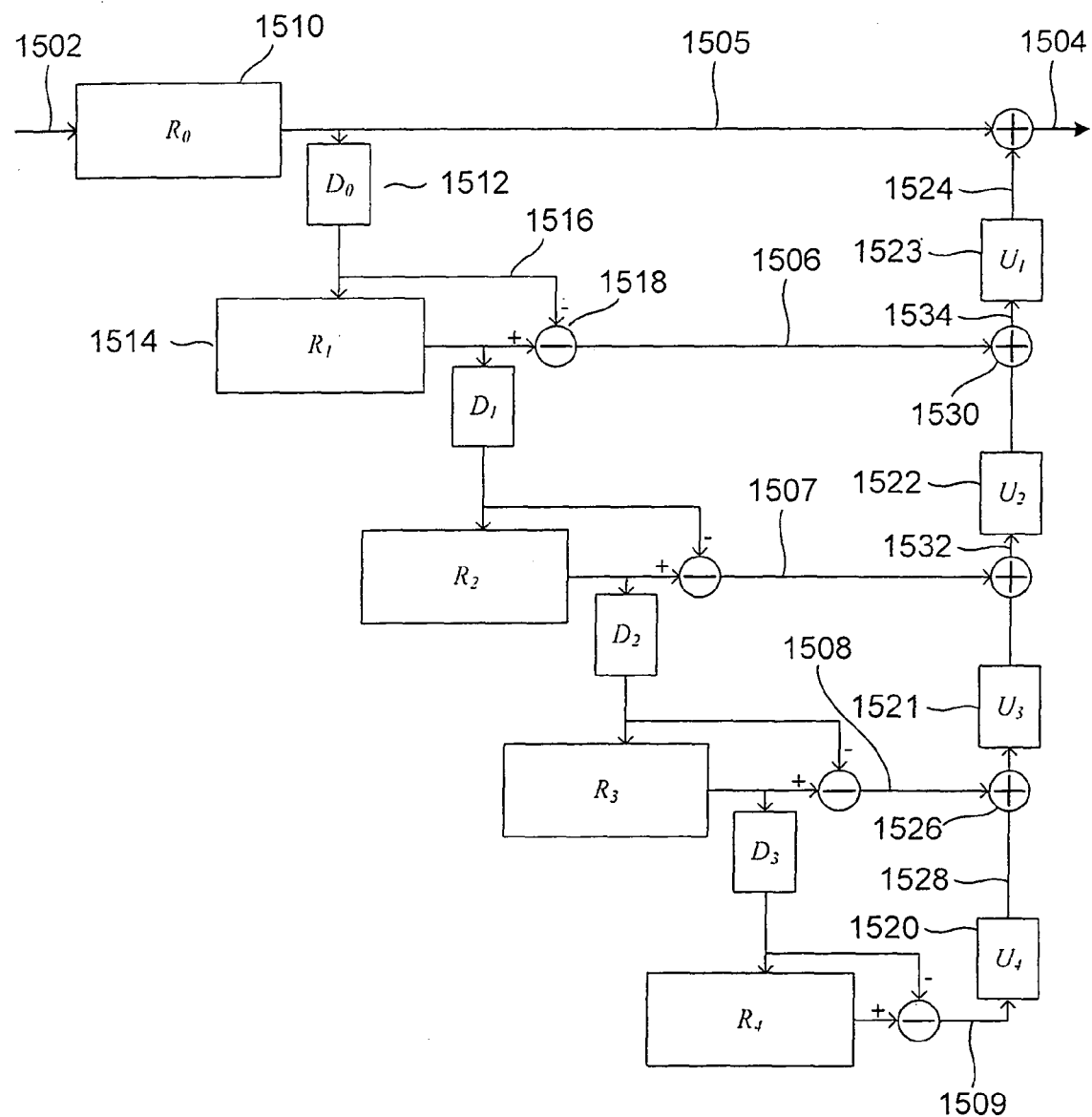
FIG. 15 illustrates one multi-scale robust sharpening and contrast-enhancing method that represents an embodiment of the present invention.

FIG. 14 shows a number of illustration conventions used in FIG. 15. The first symbol 1402 represents the robust-filtering operation, discussed above with reference to FIGS. 10-13. The second symbol 1404 represents the D operation, discussed above with reference to FIGS. 6-7. The third symbol 1406 represents the U operation, discussed above with reference to FIG. 9. The fourth symbol 1408 represents addition of two images or signals, as discussed above with reference to FIG. 3. The final symbol 1410 represents subtraction of one image from another, also discussed above with reference to FIG. 3. Note that the R, D, and U symbols are subscripted by a scale s. The various R, D, and U operations may be, in various embodiments of the present invention, scale dependent, with different R, D, and U used at different scales. As discussed above, there are many alternative R, D, and U operation embodiments.

FIG. 15 illustrates one multi-scale robust sharpening and contrast-enhancing method that represents an embodiment of the present invention. Input to the method is represented by arrow 1502. Output of the sharpened input image is represented by arrow 1504. Each level of FIG. 15, corresponding to horizontal lines 1505-1509 that each represents a correction signal, corresponds to a different scale at which robust filtering is carried out according to the described embodiment of the present invention. Thus, scale s=0 corresponds to horizontal line 1505 in FIG. 15, scale s=1 corresponds to horizontal line 1506 in FIG. 15, etc. The input image 1502 is first subject to robust filtering 1510 and the output from robust filtering is then subject to the D operation 1512 to produce both input to the second robust filter 1514 as well as input to 1516 a subsequent image subtraction operation 1518 that produces a correction signal.

In FIG. 15, robust filtering is carried out at five different scales, or resolutions. In general, the number of scales, resolutions, or, equivalently, levels is a selectable parameter, within constraints arising from the image and window sizes, computational-efficiency constraints, and other considerations. The values representing scales increase with decreasing resolution, according to the labeling conventions used in FIG. 15. At each scale, the input image at that scale is first robustly filtered, and then subject to the D operation to produce input to the next highest scale, or, equivalently, to the next lowest resolution. Following robust filtering and D operations performed at the five different scales, a series of U operations 1520-1523 are performed to produce a final U-operation output 1524 which is added to the first robust-filter output 1505 to produce the final, sharpened output image 1504. A correction signal is produced, at each scale, by a subtraction operation, such as subtraction operation 1518. At a given scale (e.g. the scale corresponding to line 1506), the correction signal 1506 is added 1530 to output from an upscale operation 1522 carried out on an intermediate output 1532 from a lower-resolution scale, and the sum of the intermediate output signal and the correction signal comprise the output signal 1534 at the given scale that is input to a next upscale operation 1523.

In general, the input image at a particular scale is subtracted from the robust-filtering output at that scale to produce input to a U operation that generates one input to the U operation of a lower-numbered scale. At intermediate levels, the output from robust filtering at the intermediate level minus the input from that level is added, by an image-addition operation, such as image-addition operation 1526, to output from the U operation of a preceding level, such as output 1528, and the image sum is then input to the U operation of the next, higher-level resolution or lower-numbered scale. Thus, according to the present invention, at each level, the image is robustly filtered, in order to sharpen and enhance the image, and then downscaled and, optionally, smoothed, by a D operation, to produce the input for the next lowest-resolution level of processing. The differences between output of the robust filter and the input to the robust filter are used, in addition to output of a lower-resolution-level U operation, as input to a U operation at that level to generate output to the next higher-resolution level.

It should be noted that FIG. 15, and FIGS. 17-22, discussed below, use circuit-diagram-like representations of the operations carried out in order to implement various embodiments of the multi-scale robust sharpening and contrast-enhancing method that represent embodiments of the present invention. These operations may be implemented as software routines, firmware routines, logic circuits, or a combination of software routines, firmware routines, and logic circuits. FIG. 15, and FIGS. 17-22, discussed below, are intended to show the ordering of operations, described above, that implement the various embodiments of the present invention, and are not intended to suggest that the present invention is a circuit or necessarily implemented as a circuit.

Figure 16:
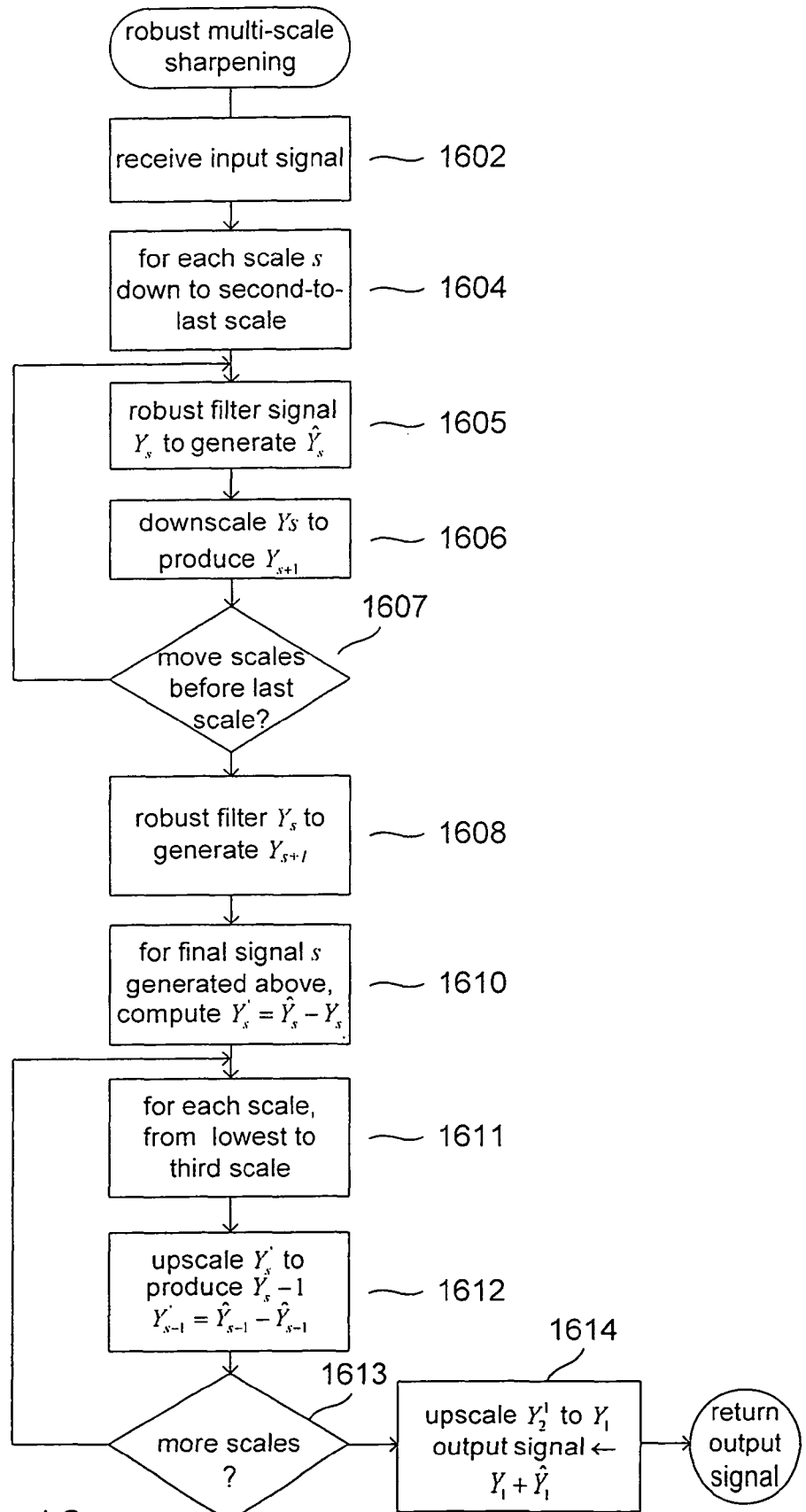
FIG. 16 is a control-flow diagram that illustrates the embodiment of the present invention shown in FIG. 15.

FIG. 16 is a control-flow diagram that illustrates the embodiment of the present invention shown in FIG. 15. In step 1602, an input signal is received. In the for-loop of steps 1604-1607, the robust filtering and downscaling and smoothing operations are carried out for each scale down to the second-to-last scale. In step 1608, the robust filtering operation for the final scale is carried out. Then, in the for-loop of steps 1610-1613, the U operations are performed for each scale from the final scale up to the second scale. Finally, in step 1614, the output from the U operation for the second scale (1524 in FIG. 15) is added to the output of robust filtering at the first scale (1505 in FIG. 15) to produce a final output signal that is returned.

Figure 17:
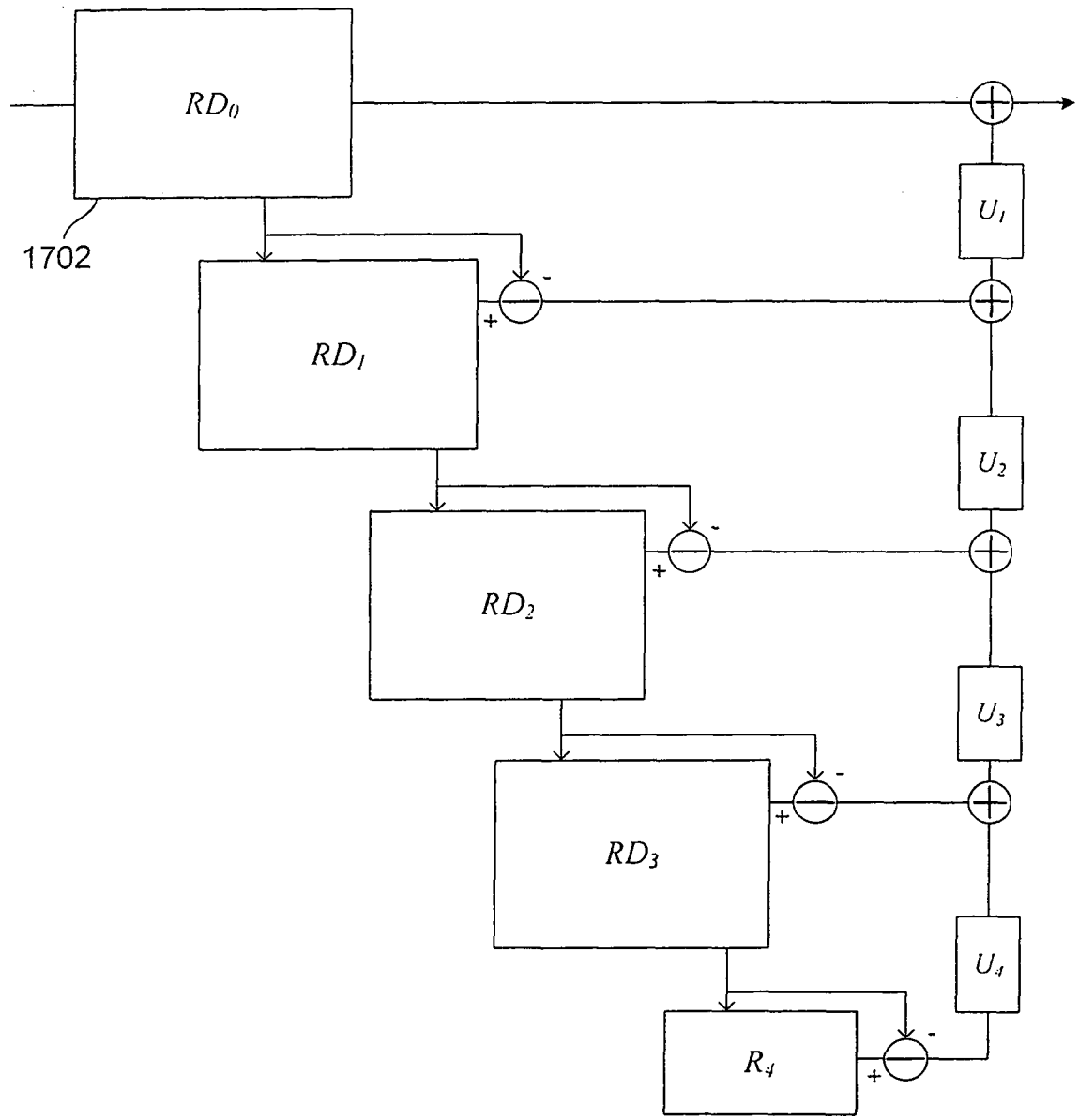
FIG. 17 shows an alternative multi-scale robust sharpening and contrast-enhancing method that represents an embodiment of the present invention.

FIG. 17 shows an alternative multi-scale robust sharpening and contrast-enhancing method that represents an embodiment of the present invention. In FIG. 17, each pair of R and D operations, at each scale, in the embodiment shown in FIG. 15, is replaced by a combined R and D operation. For example, combined R and D operation 1702 replaces operations $R_I$ and $D_I$ (1510 and 1512 in FIG. 15). By combining R and D operation, greater computational efficiency can be obtained, by, for example, using a single combined windowing and convolution-mask operation at each pixel, rather than twice iterating through all of the pixels.

Figure 18A:
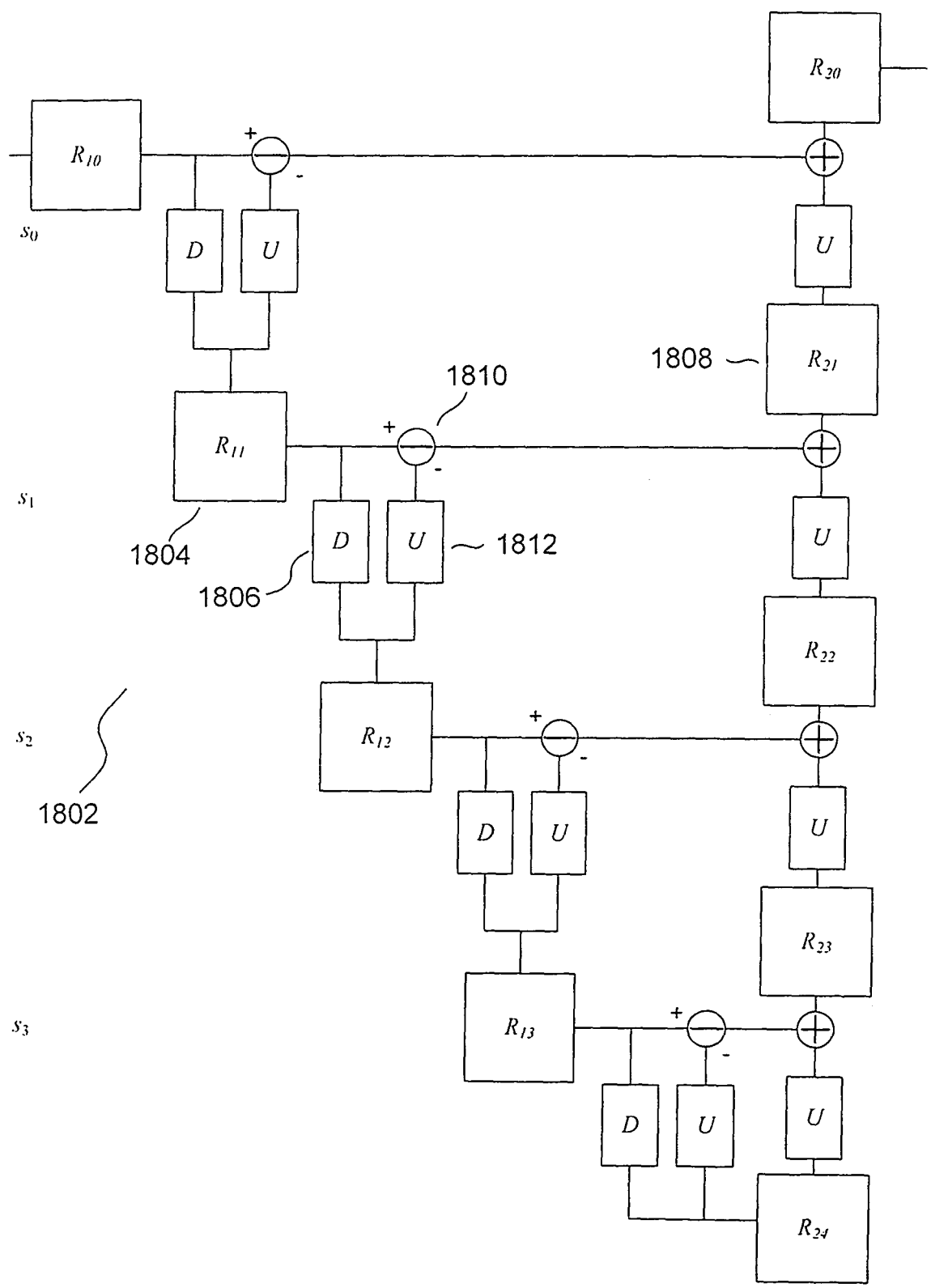
FIGS. 18A-B show a generalized embodiment of the multi-scale robust sharpening and contrast-enhancing method that represents an embodiment of the present invention.
Figure 18B:
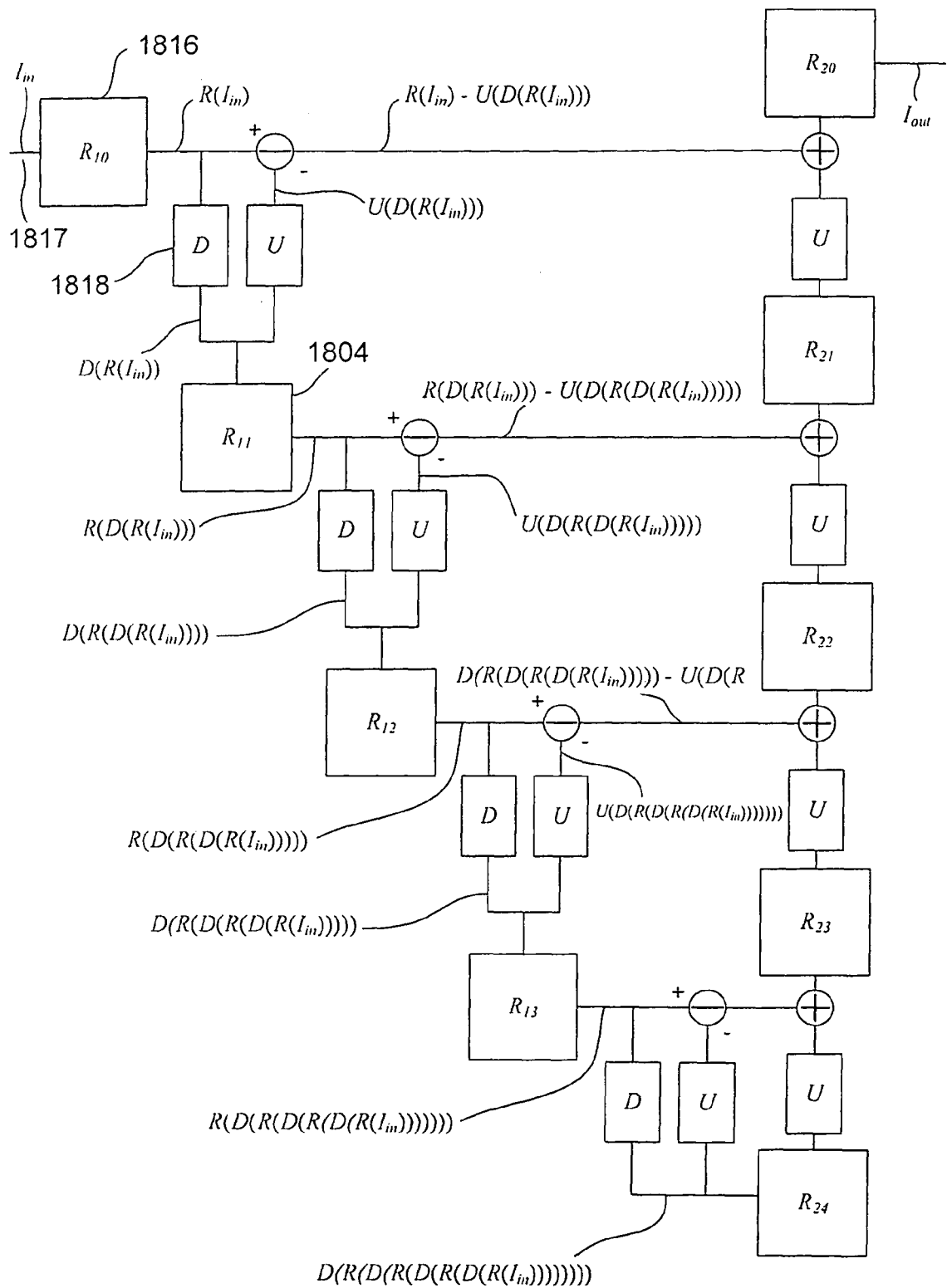

FIGS. 18A-B show a generalized embodiment of the multi-scale robust sharpening and contrast-enhancing method that represents an embodiment of the present invention. FIGS. 18A-B use the same illustration conventions as used in FIGS. 15 and 17. As with FIGS. 15 and 17, FIGS. 18A-B show a fixed number of scales, but, as discussed above, the number of scales used in multi-scale robust filtering methods of the present invention may be parametrically specified, according to desired levels of sharpening and enhancement, computational constraints, and image dimensions.

As shown in FIG. 18A, a robust filter is employed twice at each scale, one prior to downscaling to the next, lower-resolution scale, and once prior to upscaling to the next higher-resolution scale. For example, at scale $s_1$ 1802, a robust-filtering module 1804 is employed prior to downscaling 1806 to scale $s=s_2$, and a second robust filtering module 1808 is used for upscaling from level $s=s_1$ to level $s=s_0$. Robust filtering may precede each of the downscale and upscale operations, in the generalized embodiment, and, in many embodiments, the robust filtering can be combined with both upscale and downscale operations. In the generalized embodiment, each correction image at each scale is generated by upscaling a robustly-filtered image at the scale, which has been downscaled to a next lower-resolution scale, and subtracting the upscaled, robustly-filtered and previously downscaled image from the output of robust filtering at the scale. For example, the correction image at scale $s=s_1$, in FIG. 18A, is produced by subtracting, via subtraction operation 1810, the downscaled 1806 and then upscaled 1812 output of robust filter 1804 from the output of the robust filter 1804. Two upscale operations, at each scale, are need when the scaling operations are non-linear. However, as discussed below, when the scaling operations are linear, the multi-scale robust sharpening and contrast-enhancement method can be simplified.

FIG. 18B shows the generalized embodiment of the multi-scale robust sharpening and contrast-enhancing method shown in FIG. 18A, with notation added to show certain of the mathematical entities produced as a result of each operation. For example, output from robust-filter operation 1804 is shown to be $R(D(R(I_{in})))$, indicating that the output is generated by a robust-filter operation (1816 in FIG. 18B) applied to the input image (1817 in FIG. 18B), followed by a downscale operation 1818, and then the robust-filter operation 1804.

Figure 19:
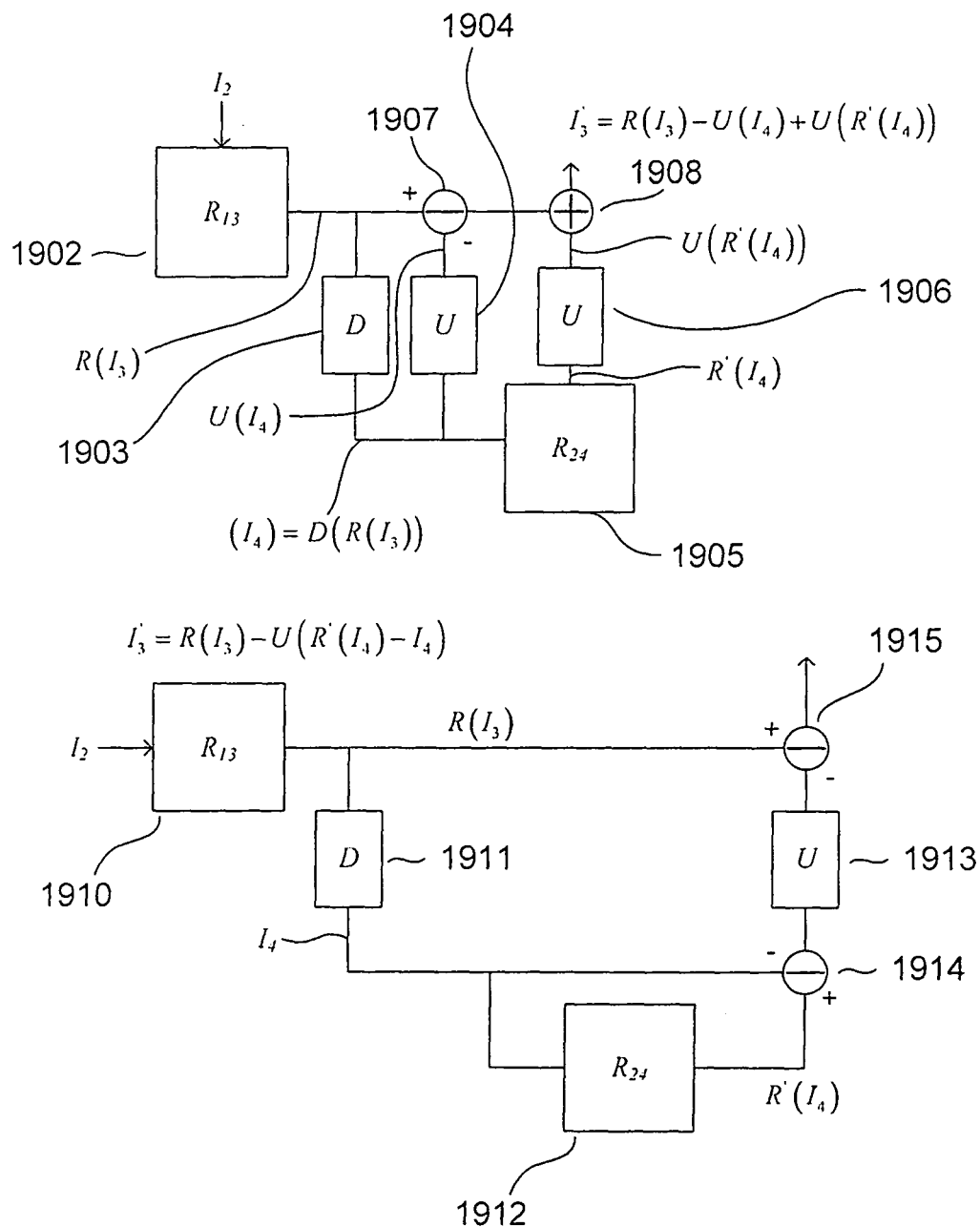
FIG. 19 illustrates a simplification step available to embodiments of the present invention that employ linear scaling operations.

FIG. 19 illustrates a simplification step available to embodiments of the present invention that employ linear scaling operations. In FIG. 19, the lowest-resolution-level seven operations 1902-1908 from the multi-scale robust sharpening and contrast-enhancing method shown in FIGS. 18A-B are again shown. Below them, six operations 1910-1915 that together provide equivalent output are shown. Output from the addition operation 1908 of the original operations is shown, in FIG. 19, to be:

$$I_3' = R(I_3) - U(I_4) + U(R'(I_4))$$

When the upscale operations U are linear, then the U operation is distributive, and the following operations are equivalent, by operation algebra, to those representing the output from addition operation 1908:

$$I_3' = R(I_3) - U(R'(I_4) - I_4)$$

Figure 20:
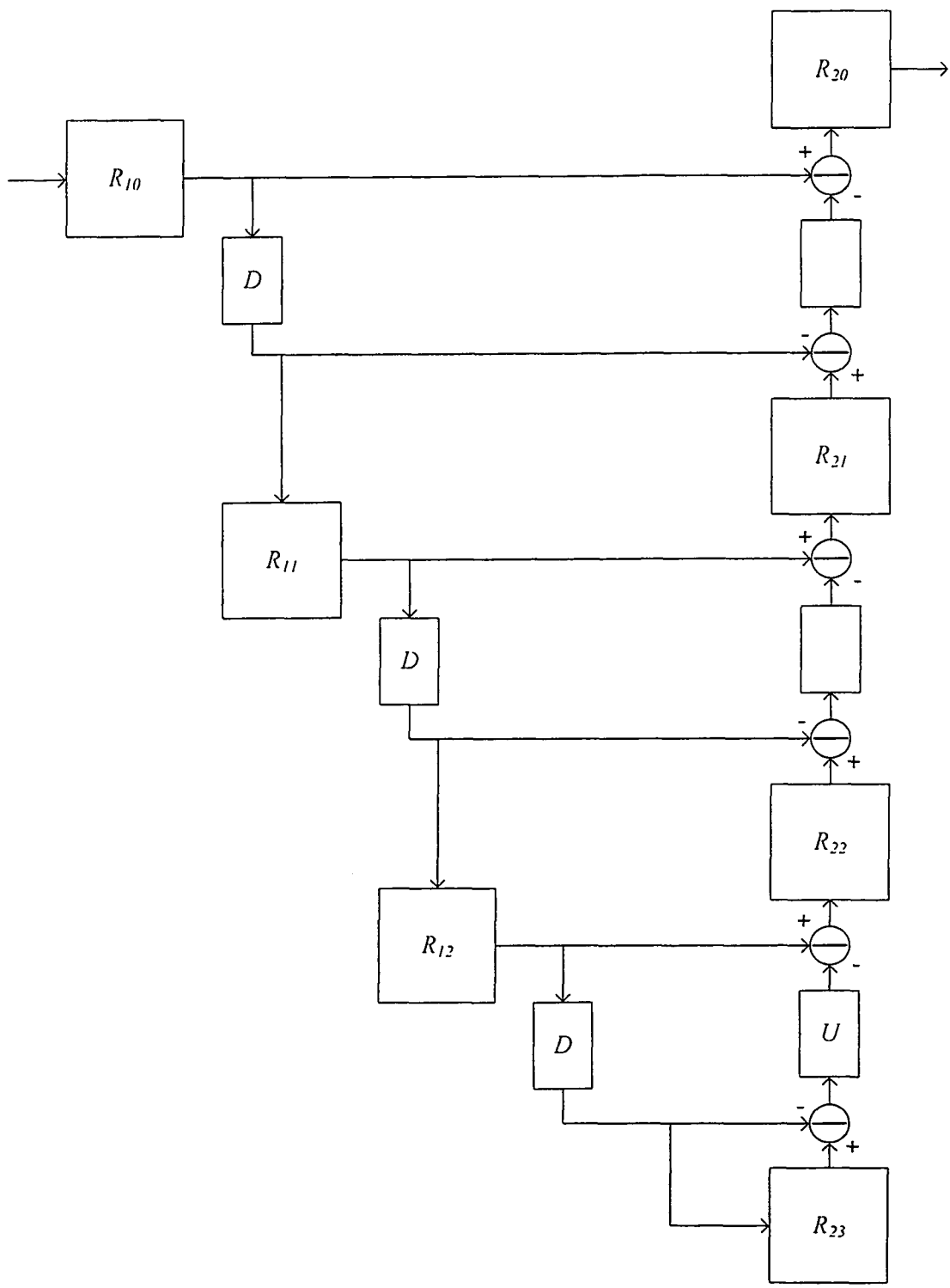
FIG. 20 shows the generalized embodiment of the multi-scale robust sharpening and contrast-enhancing method of FIG. 18A following elimination of unneeded linear upscale operations.

The six operations 1910-1915 displayed in the bottom portion of FIG. 19 implement the second of the above expressions, and therefore outputs the same sharpened and contrast-enhanced signal as output from the original seven operations. In short, when the scaling operations are linear, the upscale operation 1904 can be eliminated. By similar mathematical manipulation, corresponding upscale operations can be eliminated from each scale level within the generalized embodiment of the multi-scale robust sharpening and contrast-enhancing method shown in FIG. 18A. FIG. 20 shows the generalized embodiment of the multi-scale robust sharpening and contrast-enhancing method of FIG. 18A following elimination of unneeded linear upscale operations.

Figure 21:
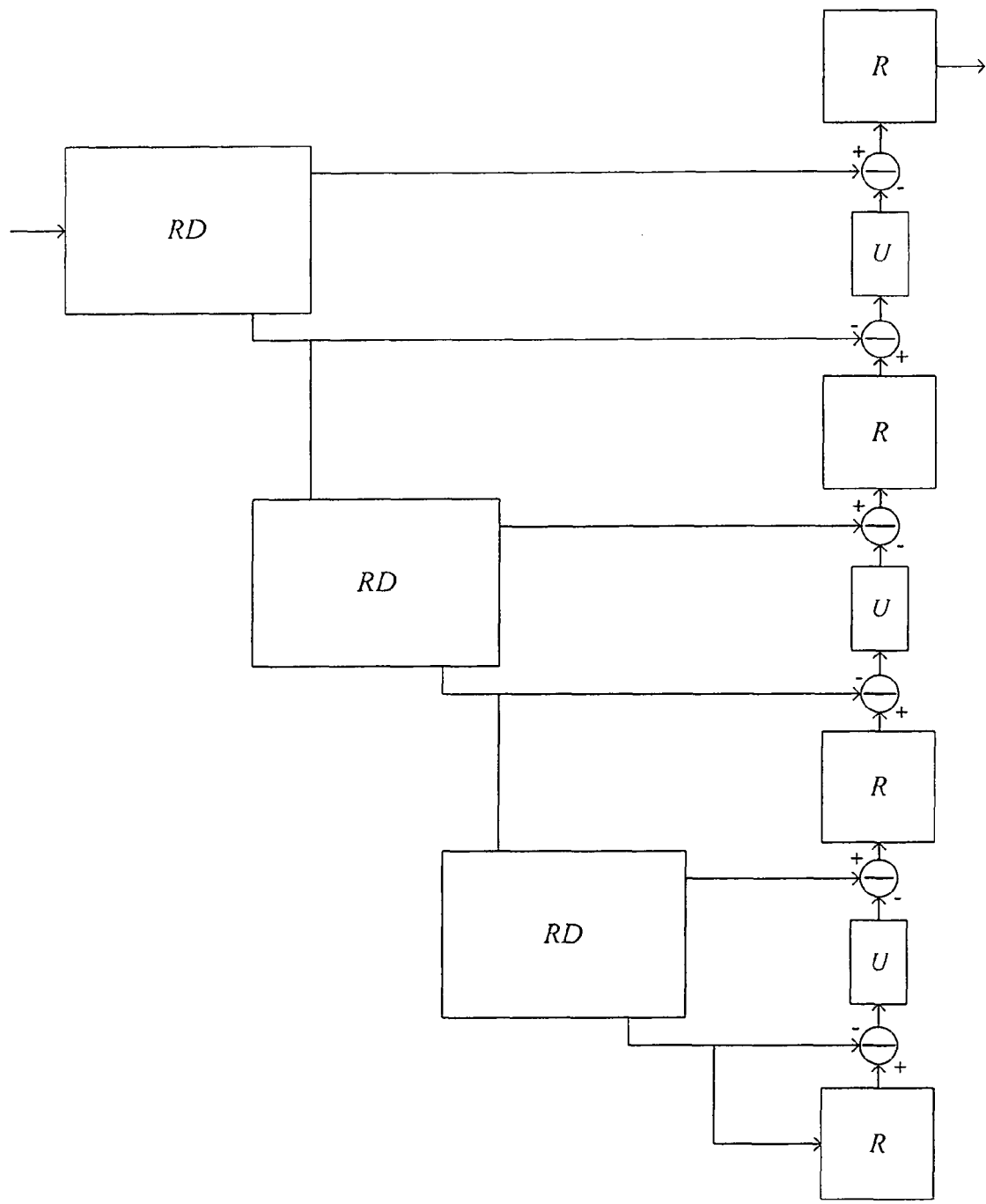
FIGS. 21-22, along with FIG. 20, illustrate step-wise simplification of the generalized embodiment of the multi-scale robust sharpening and contrast-enhancing method illustrated in FIGS. 18A-B.
Figure 22:
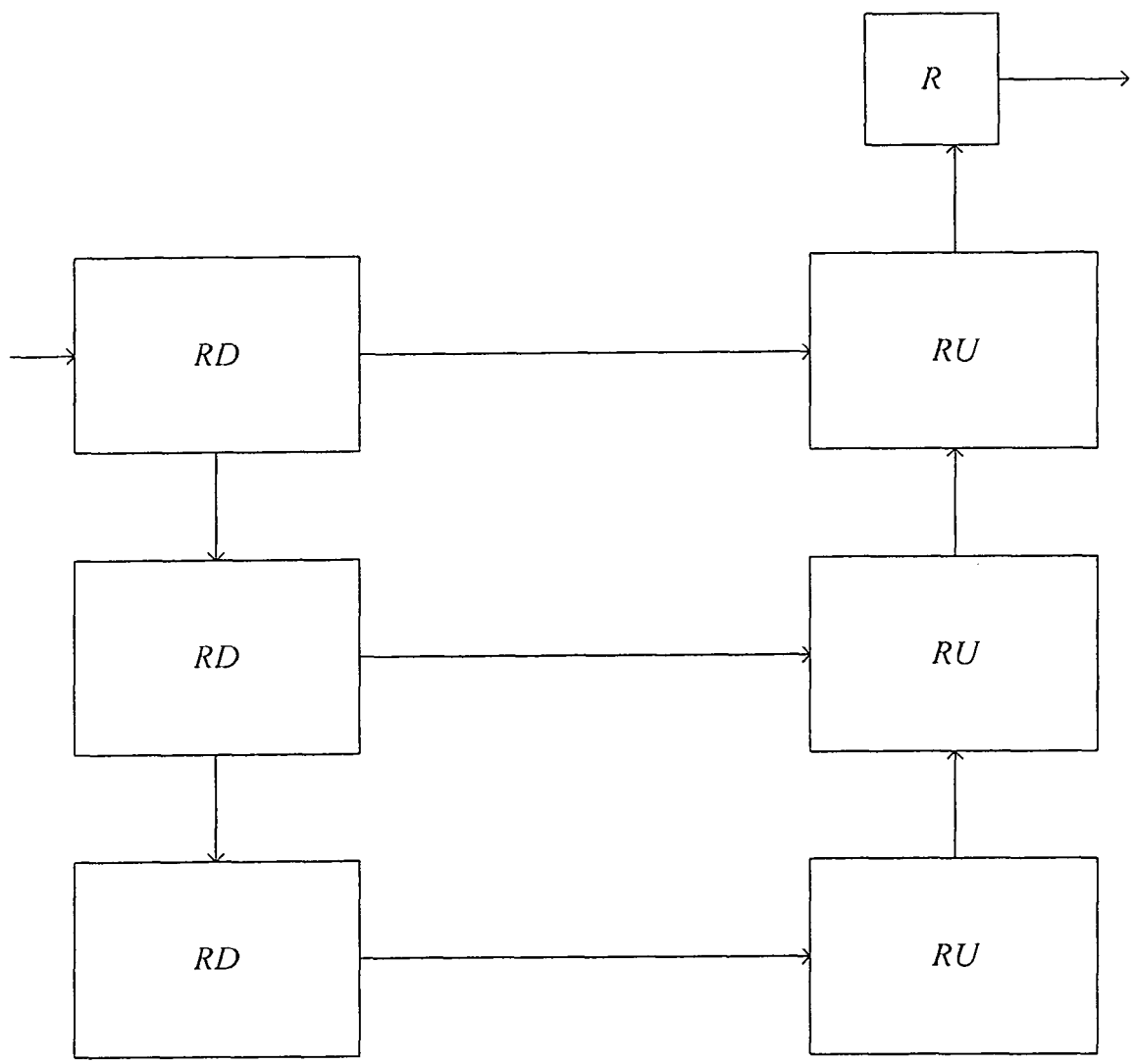

FIGS. 21-22, along with FIG. 20, illustrate step-wise simplification of the generalized embodiment of the multi-scale robust sharpening and contrast-enhancing method illustrated in FIGS. 18A-B. As discussed above, FIG. 20 is a simplification obtained by removing unneeded linear upscale operations from the multi-scale robust sharpening and contrast-enhancing method of FIG. 18A. FIG. 21 shows the multi-scale robust sharpening and contrast-enhancing method of FIG. 19 with robust-filter and downscale operations at each scale combined, further simplifying the method. FIG. 22 shows the multi-scale robust sharpening and contrast-enhancing method of FIG. 19 with robust-filter and upscale operations at each scale combined, further simplifying the method.

The disclosed embodiment of the present invention provides many advantages over currently available sharpening methods, such as the unsharp masking method described above. First, the disclosed embodiment of the present invention is computationally efficient. In alternative embodiments, the robust-filtering and D operations carried out at each level may be combined into a single operation. Image enhancement is carried out at each of a variety of different scales, leading to a natural, multi-scale enhancement with features at each of the various different scales or resolutions separately enhanced. Robust filtering allows for control of noise amplification and for sharpening artifacts, such as halos. Furthermore, the predicted sharpened image value $\hat{Y}(i,j)$ for each pixel, for currently available techniques, can be seen to be conditioned on the probability of the average of the pixel intensities within a mask centered at $Y(i,j)$, while, in the current method, the predicted sharpened-image pixel value $\hat{Y}(i,j)$ is conditioned on each of the probabilities of the intensities of the neighboring pixels within the mask.

Although the present invention has been described in terms of particular embodiments, it is not intended that the invention be limited to these embodiments. Modifications within the spirit of the invention will be apparent to those skilled in the art. For example, any number of different embodiments of the present invention can be obtained through varying various programming parameters, including programming language, control structures, data structures, modular organization, variable names, and other such programming parameters. The method and system embodiments of the present invention can be tailored to specific applications by adjusting a number of different parameters. For example, at each scale a different window size, a different $\phi_s$ function, and a different $\psi_s$ function may be employed, in order to effect scale-appropriate robust filtering. A different number of scales, or resolution levels, may be employed in different embodiments of the present invention, depending on the input image size, granularity of scale-based enhancement desired, and other such considerations. Different types of weight masks and weight-mask values may be used in the smoothing and downscaling operations and corresponding upscale operations D and U. Additionally, the D and U operations may employ different downscaling and upscaling ratios. While the images discussed in the above examples are square images, techniques of the present invention are straightforwardly applied to rectangular images as well as to images with other geometries. Masks in windows may be square, rectangular, or have other geometries, according to various embodiments of the present invention. In an alternative embodiment, the intermediate U operations can be combined into a single operation. In certain embodiments of the present invention, the method may be employed to deblur images and other signals. The method of the present invention can be incorporated into any number of different types of systems and devices that employ sharpening, contrast-enhancement, and/or deblurring functionality.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A signal-processing system comprising:
    a processing component for executing signal processing instructions; and
    a signal-processing routine executed by the processing component that receives pixel data presenting a digital image and outputs pixel data representing a sharpened version of the digital image, wherein the signal-processing routine,
at each of one or more currently considered scales of resolution greater than a lowest resolution scale, processes an input signal to produce an output signal by
downscaling either the input signal or a first internal signal derived from the input signal to produce a next input signal for a next-lower resolution scale,
upscaling a second internal signal received from a lower-resolution scale to produce a first intermediate signal from which the output signal to a next-higher-resolution scale is produced, and
robustly filtering at least one of the input signal and the first intermediate signal by differencing each pixel in the image with a plurality of surrounding pixels and using those differences to identify corresponding values of a non-linear function, the combination of which provides a value for a corresponding pixel in a robustly filtered version of the image;
wherein said robustly filtering further comprises a function to remove any new local maxima and minima introduced by the robust filtering.

2. The signal-processing system of claim 1 wherein the first internal signal derived from the input signal is derived by robustly filtering the input signal.

3. The signal-processing system of claim 1 wherein a second intermediate signal is produced by combining the first intermediate signal with one of:
the input signal;
a robustly-filtered input signal; and
a robustly-filtered input from which a third intermediate signal is subtracted, the second intermediate signal obtained by first downscaling and then upscaling the robustly-filtered input signal.

4. The signal-processing system of claim 3 wherein the second intermediate signal is output, as the output signal, to a next-higher-resolution scale.

5. The signal-processing system of claim 3 wherein the second intermediate signal is first robustly filtered to produce the output signal that is output to a next-higher-resolution scale.

6. The signal-processing system of claim 5 wherein upscaling the first intermediate signal, combining the first intermediate signal with another signal to produce the second intermediate signal, and robustly filtering the second intermediate signal are combined together in a single upscaling, combining, and filtering operation.

7. The signal-processing system of claim 3 wherein robustly filtering the input signal and downscaling the robustly-filtered input signal are combined together in a single filtering and downscaling operation.

8. The signal-processing system of claim 1 wherein a number of scales at which the signal-processing routine processes input signals is specified by one or more of:
an implementation parameter;
a run-time parameter; and
a computed value based on signal characteristics, a desired signal-processing result, and a desired signal-processing efficiency.

9. The signal processing system of claim 1 wherein robustly filtering a signal encoding pixel values of a two-dimensional pixel-value matrix comprises:
for each considered pixel value,
computing metrics based on pixel values neighboring the considered pixel value,
applying a non-linear function to each of the metrics to generate intermediate values,
computing a filtered value from the intermediate values, and
applying an artifact-and-distortion-restraining function to the filter value;
wherein neighboring pixel values may be identified within the signal, within an upscaled or downscaled version of the signal, within a modified signal, and within preceding or following portions of a currently-considered portion of the signal.

10. The signal processing system of claim 1
wherein downscaling of a signal is carried out by one or more of
subsampling the signal,
smoothing the signal, and
applying a non-linear transformation to the signal; and
wherein upscaling of a signal is carried out by one or more of
expanding the signal with linear or non-linear interpolation,
expanding the signal using an operation related to smoothing, and
applying a non-linear transformation to the signal.

11. A signal-processing method that processes an input signal comprising pixel data presenting a digital image to produce an output signal comprising pixel data representing a sharpened version of the digital image, the method comprising:
at each of one or more currently considered scales of resolution greater than a lowest resolution scale,
downscaling either the input signal or a second internal signal derived from the input signal to produce a next input signal for a next-lower resolution scale,
upscaling a third internal signal received from a lower-resolution scale to produce a first intermediate signal from which the output signal to a next-higher-resolution scale is produced, and
robustly filtering at least one of the input signal and the first intermediate signal by differencing each pixel in the image with a plurality of surrounding pixels and using those differences to identify corresponding values of a non-linear function, the combination of which provides a value for a corresponding pixel in a robustly filtered version of the image;
further comprising applying a function to remove any new local maxima and minima introduced by the robust filtering.

12. The method of claim 11 wherein the second internal signal derived from the input signal is derived by robustly filtering the input signal.

13. The method of claim 11 wherein a second intermediate signal is produced by combining the first intermediate signal with one of:
the input signal;
a robustly-filtered input signal; and
a robustly-filtered input from which a third intermediate signal is subtracted, the second intermediate signal obtained by first downscaling and then upscaling the robustly-filtered input signal.

14. The method of claim 13 wherein the second intermediate signal is output, as the output signal, to a next-higher-resolution scale.

15. The method of claim 13 wherein the second intermediate signal is first robustly filtered to produce the output signal that is output to a next-higher-resolution scale.

16. The method of claim 15 wherein upscaling the first intermediate signal, combining the first intermediate signal with another signal to produce the second intermediate signal, and robustly filtering the second intermediate signal are combined together in a single upscaling, combining, and filtering operation.

17. The method of claim 13 wherein robustly filtering the input signal and downscaling the robustly-filtered input signal are combined together in a single filtering and downscaling operation.

18. The method of claim 11 further comprising receiving an indication of a number of scales at which to process signals, the indication received as one or more of:
   an implementation parameter;
   a run-time parameter; and
   a computed value based on signal characteristics, a desired signal-processing result, and a desired signal-processing efficiency.

19. The method of claim 11 wherein robustly filtering a signal encoding pixel values of a two-dimensional pixel-value matrix comprises:
   for each considered pixel value,
      computing metrics based on pixel values neighboring the considered pixel value,
      applying a non-linear function to each of the metrics to generate intermediate values,
      computing a filtered value from the intermediate values, and
      applying an artifact-and-distortion-restraining function to the filter value;
   wherein neighboring pixel values may be identified within the signal, within an upscaled or downscaled version of the signal, within a modified signal, and within preceding or following portions of a currently-considered portion of the signal.

20. The method of claim 11
   wherein downscaling of a signal is carried out by one or more of
      subsampling the signal,
      smoothing the signal, and
      applying a non-linear transformation to the signal; and
   wherein upscaling of a signal is carried out by one or more of
      expanding the signal with linear or non-linear interpolation,
      expanding the signal using an operation related to smoothing, and
      applying a non-linear transformation to the signal.

* * * * *